United States Patent
Ishikawa et al.

(10) Patent No.: US 9,150,213 B2
(45) Date of Patent: Oct. 6, 2015

(54) GEAR SHIFTING CONTROL SYSTEM OF VEHICLE CONTINUOUSLY-VARIABLE TRANSMISSION

(71) Applicant: TOYOTA JIDOSHA KABUSHIKI KAISHA, Toyota-shi (JP)

(72) Inventors: Shuhei Ishikawa, Toyota (JP); Motonori Kimura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/486,229

(22) Filed: Sep. 15, 2014

(65) Prior Publication Data

US 2015/0088391 A1    Mar. 26, 2015

(30) Foreign Application Priority Data

Sep. 20, 2013  (JP) .................................. 2013-195658

(51) Int. Cl.
  *B60W 10/06*  (2006.01)
  *B60W 10/107*  (2012.01)

(52) U.S. Cl.
  CPC ............. *B60W 10/107* (2013.01); *B60W 10/06* (2013.01); *B60W 2710/0611* (2013.01)

(58) Field of Classification Search
  None
  See application file for complete search history.

(56) References Cited

U.S. PATENT DOCUMENTS

| 5,101,687 | A | 4/1992 | Iwatsuki et al. |
| 5,211,680 | A | 5/1993 | Sumimoto et al. |
| 6,181,020 | B1 * | 1/2001 | Uchida et al. ............... 290/40 C |
| 2010/0087287 | A1 * | 4/2010 | Tabata et al. ...................... 477/3 |
| 2013/0166121 | A1 * | 6/2013 | Takeuchi et al. ................ 701/22 |
| 2014/0100074 | A1 * | 4/2014 | Glugla ............................. 477/3 |

FOREIGN PATENT DOCUMENTS

| JP | 3-157560 | 7/1991 |
| JP | 03-281952 A | 12/1991 |
| JP | 2005-299805 A | 10/2005 |

* cited by examiner

*Primary Examiner* — Justin Holmes
(74) *Attorney, Agent, or Firm* — Oblon, McClelland, Maier & Neustadt, L.L.P.

(57) ABSTRACT

A gear shifting control system for a vehicle includes an engine, a continuously-variable transmission, and an electronic control unit. The vehicle includes driving wheels. The engine includes an electronic throttle valve controlling a torque of the engine. The continuously-variable transmission is disposed in a power transmission path between the engine and the driving wheels. The electronic control unit is configured to i) decrease the torque of the engine by decreasing a throttle opening of the electronic throttle valve when the continuously-variable transmission upshifts, and ii) output a gear shifting start command for starting the upshifting of the continuously-variable transmission with a delay relative to a decrease start command for starting the decrease of the throttle opening of the electronic throttle valve when the continuously-variable transmission upshifts.

7 Claims, 14 Drawing Sheets

|  | THROTTLE OPENING ($\theta$ th) | | | |
|---|---|---|---|---|
|  | $\theta 1$ | $\theta 2$ | $\theta 3$ | $\theta 4$ |
| TH1 | T11 | T12 | T13 | T14 |
| TH2 | T21 | T22 | T23 | T24 |
| TH3 | T31 | T32 | T33 | T34 |
| TH4 | T41 | T42 | T43 | T44 |
| TH5 | T51 | T52 | T53 | T54 |

OIL TEMPERATURE (THoil) OF WORKING OIL

GEAR SHIFTING CONTROL SYSTEM OF VEHICLE CONTINUOUSLY-VARIABLE TRANSMISSION

INCORPORATION BY REFERENCE

The disclosure of Japanese Patent Application No. 2013-195658 filed on Sep. 20, 2013 including the specification, drawings and abstract is incorporated herein by reference in its entirety.

BACKGROUND OF THE INVENTION

1. Field of the Invention

The present invention relates to a gear shifting control system of a continuously-variable transmission, and more particularly, to suppression of variation in an output shaft torque occurring during gear shifting.

2. Description of Related Art

In order to suppress a variation of an output shift torque occurring when an inertia phase is started in so-called upshifting which is gear shifting to a speedup side of an automatic transmission, a gear shifting controller of an automatic transmission is known which performs a so-called torque-down control of decreasing an engine torque during gear shifting by controlling an electronic throttle valve of an engine so as to decrease a throttle opening. An example of the gear shifting controller of an automatic transmission is described in Japanese Patent Application Publication No. 3-157560 (JP 3-157560 A).

JP 3-157560 A describes that a region (hereinafter, referred to as dead zone) in which the variation of the engine torque with respect to the variation of the throttle opening is small is present in a high-opening region of the electronic throttle valve. In this regard, when upshifting is carried out from the high-opening region of the electronic throttle valve, the decrease in the engine torque is delayed with respect to the decrease in the throttle opening and the torque-down control is not performed from the gear shifting start time, whereby there is a problem in that a sufficient gear shifting shock reducing effect based on the torque-down is not obtained. As a solution to this problem, JP 3-157560 A discloses a technique of enabling the start of the torque-down of the engine at the inertia phase start time of the automatic transmission by decreasing the throttle opening of the electronic throttle valve up to the lower end of the dead zone in advance before starting the inertia phase of the automatic transmission when the gear shifting of the automatic transmission is determined.

SUMMARY OF THE INVENTION

In a stepped-variable automatic transmission, since the delay time is relatively long until the gear shifting is started (the inertia phase is started) after a gear shifting start command is output, the throttle opening can be decreased up to the lower end of the dead zone in advance before starting the gear shifting as described in JP 3-157560 A. However, in a continuously-variable transmission in which a speed ratio is changed in a stepless manner, since the time until the shifting is started after the shifting start command is output is shorter than that in the stepped-variable automatic transmission, it is difficult to guarantee the time to decrease the throttle opening up to the lower end of the dead zone in advance. Therefore, since it is difficult to decrease the engine torque substantially at the same time as the timing of starting the shifting, the torque-down effect is not obtained at the shifting start time and there is a possibility that a variation of the output shaft torque will occur during shifting.

The present invention provides a shifting control system of a vehicle continuously-variable transmission that can suppress a variation of an output shaft torque which occurs during shifting when the vehicle continuously-variable transmission upshifts.

According to an aspect of the present invention, there is provided a shifting control system for a vehicle. The vehicle includes driving wheels. The shifting control system includes an engine, a continuously-variable transmission, and an electronic control unit. The engine includes an electronic throttle valve configured to change a torque of the engine. The continuously-variable transmission is disposed in a power transmission path between the engine and the driving wheels. The electronic control unit is configured to i) decrease the torque of the engine by decreasing a throttle opening of the electronic throttle valve when the continuously-variable transmission upshifts, and ii) output a shifting start command for starting the upshifting of the continuously-variable transmission with a delay relative to a decrease start command for starting the decrease of the throttle opening of the electronic throttle valve when the continuously-variable transmission upshifts.

According to this configuration, by decreasing the throttle opening of the electronic throttle valve in advance while delaying the shifting start command of the continuously-variable transmission for a vehicle in order to start the decrease of the engine torque at the time of starting the shifting of the continuously-variable transmission for a vehicle, the decrease of the engine torque can be started from the shifting start time of the continuously-variable transmission for a vehicle. Accordingly, since a torque-down control is performed from the shifting start time, it is possible to suppress a variation of an output shaft torque that occurs during the shifting.

In the shifting control system for a vehicle, the electronic control unit may be configured to decrease the throttle opening to a predetermined value after the decrease start command is output, and the electronic control unit may be configured to further decrease the throttle opening when the shifting start command of the continuously-variable transmission is output. In the shifting control system, the electronic control unit may be configured to decrease the throttle opening to a predetermined value after the decrease start command is output, and the electronic control unit may be configured to further decrease the throttle opening when determining that the upshifting is started. According to this configuration, when a throttle opening decrease command of the electronic throttle valve is output, it is possible to start the decrease of the engine torque substantially at the same time as starting the shifting by decreasing the throttle opening to a predetermined value in advance before the shifting start command is output.

In the shifting control system, the upshifting of the continuously-variable transmission may be shifting based on a driver's manual operation. According to this configuration, since the shifting start command is delayed relative to the start of the decrease of the throttle opening after the manual operation, the throttle opening is decreased in advance at the timing at which the shifting start command is output or at the timing at which it is determined whether the shifting is started and it is thus possible to decrease the engine torque at the same time as starting the shifting. Accordingly, it is possible to substantially synchronize the shifting start time of the continuously-variable transmission for a vehicle and the decrease start time of the engine torque with each other.

In the shifting control system, the upshifting of the continuously-variable transmission may be stepped automatic shifting. According to this configuration, since the shifting start command of the continuously-variable transmission for a vehicle is delayed relative to the decrease start time of the throttle opening, the throttle opening is decreased in advance at the timing at which the shifting start command is output or at the timing at which it is determined whether the shifting is started and it is thus possible to decrease the engine torque at the same time as starting the shifting. Accordingly, it is possible to substantially synchronize the shifting start time of the continuously-variable transmission for a vehicle and the decrease start time of the engine torque with each other.

In the shifting control system, the electronic control unit may be configured to determine whether the continuously-variable transmission upshifts, and the electronic control unit may be configured to change a delay time until the shifting start command is output after determining that the continuously-variable transmission upshifts on the basis of at least one of the throttle opening of the electronic throttle valve and an oil temperature of working oil of the continuously-variable transmission. For example, the larger the throttle opening of the electronic throttle valve becomes, the longer the time for decreasing the throttle opening to the predetermined value becomes. Accordingly, the larger the throttle opening becomes, the longer the shifting delay time is set. In a state where the oil temperature of the working oil is low, the lower the oil temperature of the working oil becomes, the more the start of the shifting is delayed and the shorter the shifting delay time becomes. In this way, by appropriately changing the shifting delay time on the basis of at least one of the throttle opening of the electronic throttle valve and the oil temperature of the working oil, it is possible to substantially synchronize the shifting start time of the continuously-variable transmission for a vehicle and the decrease start time of the engine torque with each other and to suppress an increase of the shifting delay time.

Preferably, the predetermined value is set to the lower end of the region in which the variation of the engine torque with respect to the variation of the throttle opening is smaller than the variation of the engine torque in a region in which the throttle opening is less than the predetermined value or the value around the lower end.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Preferably, in a continuously-variable transmission, a delay time until gear shifting is started after a gear shifting start command is output, specifically, until the gear shifting is started, is shorter than that in a stepped-variable automatic transmission. That is, in the continuously-variable transmission, the gear shifting is started immediately when the gear shifting start command is output.

Hereinafter, embodiments of the present invention will be described in detail with reference to the accompanying drawings. In the embodiments, the drawings are appropriately simplified or deformed and the dimensions and the shapes of respective elements are not accurately matched with actual ones.

Embodiment 1

Figure 1:
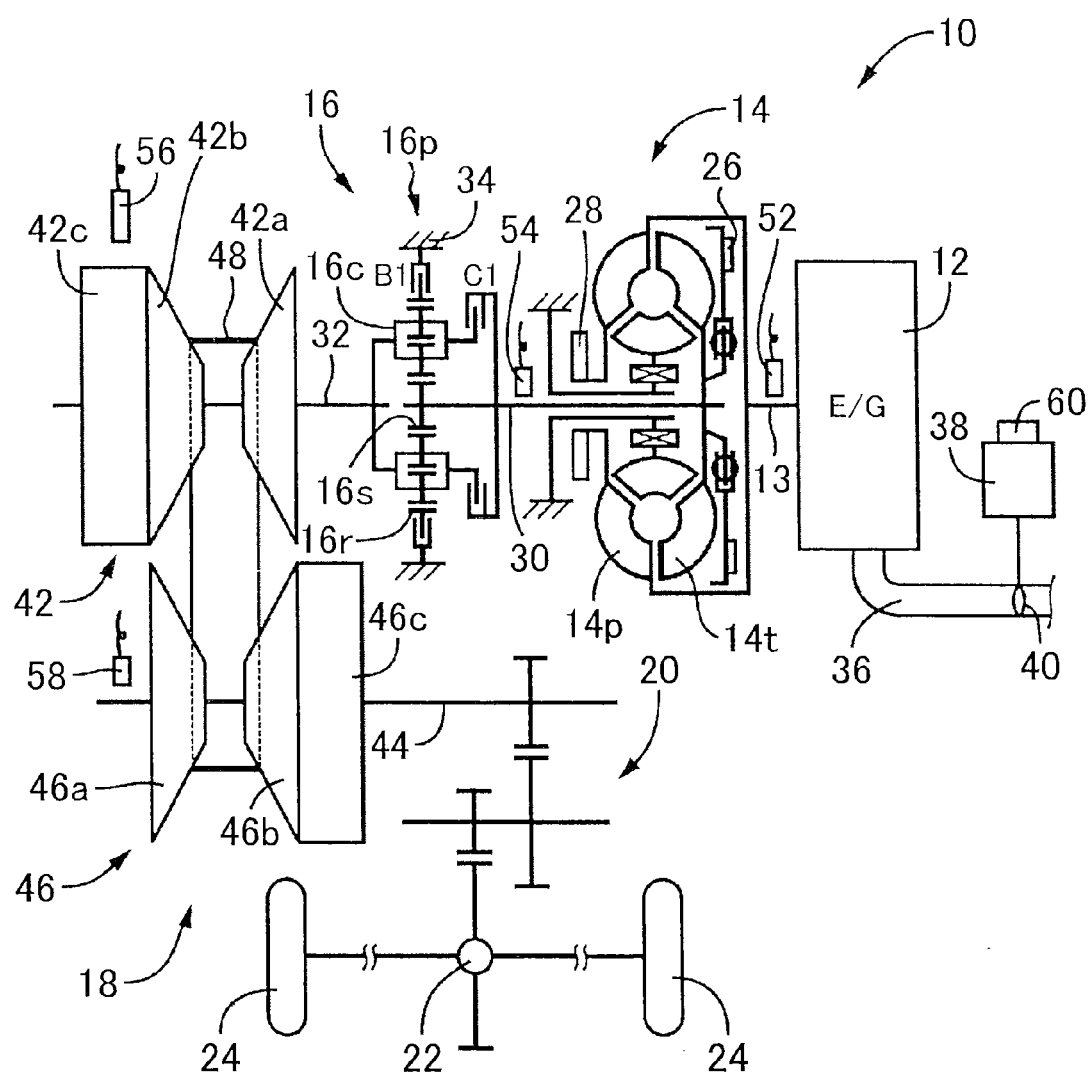
FIG. 1 is a diagram schematically illustrating a configuration of a power transmission path from an engine to driving wheels in a vehicle to which the present invention is suitably applied.

FIG. 1 is a diagram schematically illustrating a configuration of a power transmission path from an engine 12 to driving wheels 24 in a vehicle 10 to which the present invention is suitably applied. In FIG. 1, for example, dynamic power generated by the engine 12 used as a running drive source is transmitted to the right and left driving wheels 24 sequentially via a torque converter 14 as a hydraulic power transmission, a forward/backward switching unit 16, a belt-type continuously-variable transmission 18 (hereinafter, referred to as continuously-variable transmission 18) as a continuously-variable transmission for a vehicle, a reduction gear unit 20, a differential gear unit 22, and the like.

The torque converter 14 includes a pump wheel 14$p$ connected to a crank shaft 13 of the engine 12 and a turbine wheel 14$t$ connected to the forward/backward switching unit 16 via a turbine shaft 30 corresponding to an output-side member of the torque converter 14, and is configured to transmit dynamic power via fluid. A lockup clutch 26 is disposed between the pump wheel 14$p$ and the turbine wheel 14$t$, and the pump wheel 14$p$ and the turbine wheel 14$t$ rotate together by causing the lockup clutch 26 to completely engage. The pump wheel 14-$p$ is connected to a mechanical oil pump 28 that generates, by rotational driving of the engine 12, a working oil pressure for controlling the gear shifting of the continuously-variable transmission 18, generating a belt pinching pressure in the continuously-variable transmission 18, controlling the torque capacity of the lockup clutch 26, switching the power transmission path in the forward/backward switching unit 16, and supplying lubricant to the respective parts of the power transmission path of the vehicle 10.

The forward/backward switching unit 16 includes a forward clutch C1, a backward brake B1, and a double-pinion planetary gear unit 16$p$ as principal parts. The turbine shaft 30 of the torque converter 14 is connected to a sun gear 16$s$ as a unified body, an input shaft 32 of the continuously-variable transmission 18 is connected to a carrier 16$c$ as a unified body, the carrier 16$c$ and the sun gear 16$s$ are selectively connected to each other via the forward clutch C1, and a ring gear 16$r$ is selectively fixed to a housing 34 as a non-rotation member via the backward brake B1. The forward clutch C1 and the backward brake B1 correspond to an interrupting unit and both are hydraulic frictional engagement units that frictionally engage by a hydraulic cylinder.

In the forward/backward switching unit 16 having this configuration, when the forward clutch C1 engages and the backward brake B1 is disengaged, the forward/backward switching unit 16 can rotate as a unified body, the turbine shaft 30 is directly connected to the input shaft 32, and a forward power transmission path is set up (achieved), whereby a driving force in the forward direction is transmitted to the continuously-variable transmission 18. When the backward brake B1 engages and the forward clutch C1 is disengaged, the forward/backward switching unit 16 sets up (achieves) a backward power transmission path and the input shaft 32 reversely rotates relative to the turbine shaft 30, whereby a driving force in the backward direction is transmitted to the continuously-variable transmission 18. When the forward clutch C1 and the backward brake B1 are disengaged together, the forward/backward switching unit 16 is switched to a neutral state (power transmission-intercepted state) in which the power transmission is intercepted.

The engine 12 is constituted by an internal combustion engine such as a gasoline engine or a diesel engine. An intake air pipe 36 of the engine 12 is provided with an electronic throttle valve 40 that electrically controls an amount of intake air Qair of the engine 12 using a throttle actuator 38.

The continuously-variable transmission 18 is disposed in the power transmission path between the engine 12 and the driving wheels 24, and includes a pair of variable pulleys 42, 46 of a primary pulley 42 which is an input-side member disposed on an input shaft 32 and of which the effective diameter is variable and a secondary pulley 46 which is an output-side member disposed on an output shaft 44 and of which the effective diameter is variable and a transmission belt 48 that is suspended between the pair of variable pulleys 42, 46, whereby dynamic power is transmitted by the frictional force between the pair of variable pulleys 42 and 46 and the transmission belt 48.

The primary pulley 42 includes a fixed sheave 42$a$ as an input-side fixed rotation member fixed to the input shaft 32, a movable sheave 42$b$ as an input-side movable rotation member disposed so as not to be relatively rotatable about the input shaft 32 and to be movable in the axial direction, and a primary-side hydraulic cylinder 42$c$ as a hydraulic actuator that applies an input-side thrust (primary thrust) Win (=primary pressure Pin×pressure-receiving area) in the primary pulley 42 for changing a V-groove width therebetween. The secondary pulley 46 includes a fixed sheave 46$a$ as an output-side fixed rotation member fixed to the output shaft 44, a movable sheave 46$b$ as an output-side movable rotation member disposed so as not to be relatively rotatable about the output shaft 44 and to be movable in the axial direction, and a secondary-side hydraulic cylinder 46$c$ as a hydraulic actuator that applies an output-side thrust (secondary thrust) Wout (=secondary pressure Pout×pressure-receiving area) in the secondary pulley 46 for changing a V-groove width therebetween.

By independently controlling the primary pressure Pin as the oil pressure to the primary-side hydraulic cylinder 42$c$ and the secondary pressure Pout as the oil pressure to the secondary-side hydraulic cylinder 46$c$ through the use of a hydraulic control circuit 100, the primary thrust Win and the secondary thrust Wout are independently controlled. Accordingly, the V-groove width of the pair of variable pulleys 42 and 46 is changed to change the suspension diameter (effective diameter) of the transmission belt 48, an actual gear shifting ratio (gear ratio) γ (=input shaft rotation speed Nin/output shaft rotation speed Nout) is continuously changed, and the frictional force (belt pinching pressure) between the pair of pulleys 42 and 46 and the transmission belt 48 is controlled so as not to generate slipping of the transmission belt 48. In this way, by independently adjusting the primary thrust Win and the secondary thrust Wout, the slipping of the transmission belt 48 is prevented and the actual gear shifting ratio (actual gear ratio) γ is adjusted to be a target gear shifting ratio γ*. The input shaft rotation speed Nin is the rotation speed of the input shaft 32 and the output shaft rotation speed Nout is the rotation speed of the output shaft 44. In this embodiment, as can be seen from FIG. 1, the input shaft rotation speed Nin is equal to the rotation speed of the primary pulley 42 and the output shaft rotation speed Nout is equal to the rotation speed of the secondary pulley 46.

In the continuously-variable transmission 18, for example, when the primary pressure Pin increases, the V-groove width of the primary pulley 42 decreases and the gear shifting ratio γ decreases, that is, the continuously-variable transmission 18 upshifts. When the primary pressure Pin decreases, the V-groove width of the primary pulley 42 increases and the gear shifting ratio γ increases, that is, the continuously-variable transmission 18 downshifts. Accordingly, at the position at which the V-groove width of the primary pulley 42 is the minimum, the minimum gear shifting ratio γmin (highest-speed-side gear shifting ratio, most Hi) is formed as the actual gear shifting ratio γ of the continuously-variable transmission 18. At the position at which the V-groove width of the primary pulley 42 is the maximum, the maximum gear shifting ratio γmax (lowest-speed-side gear shifting ratio, most Low) is formed as the actual gear shifting ratio γ of the continuously-variable transmission 18. The slipping of the transmission belt 48 (belt slip) is prevented by the primary pressure Pin (with the same meaning as the primary thrust Win) and the secondary pressure Pout (with the same meaning as the secondary thrust Wout) and the target gear shifting ratio γ* is realized on the basis of the correlation between the primary thrust Win and the secondary thrust Wout, but the target gear shifting ratio is not realized by only one pulley pressure (with the same meaning as the thrust).

Figure 2:
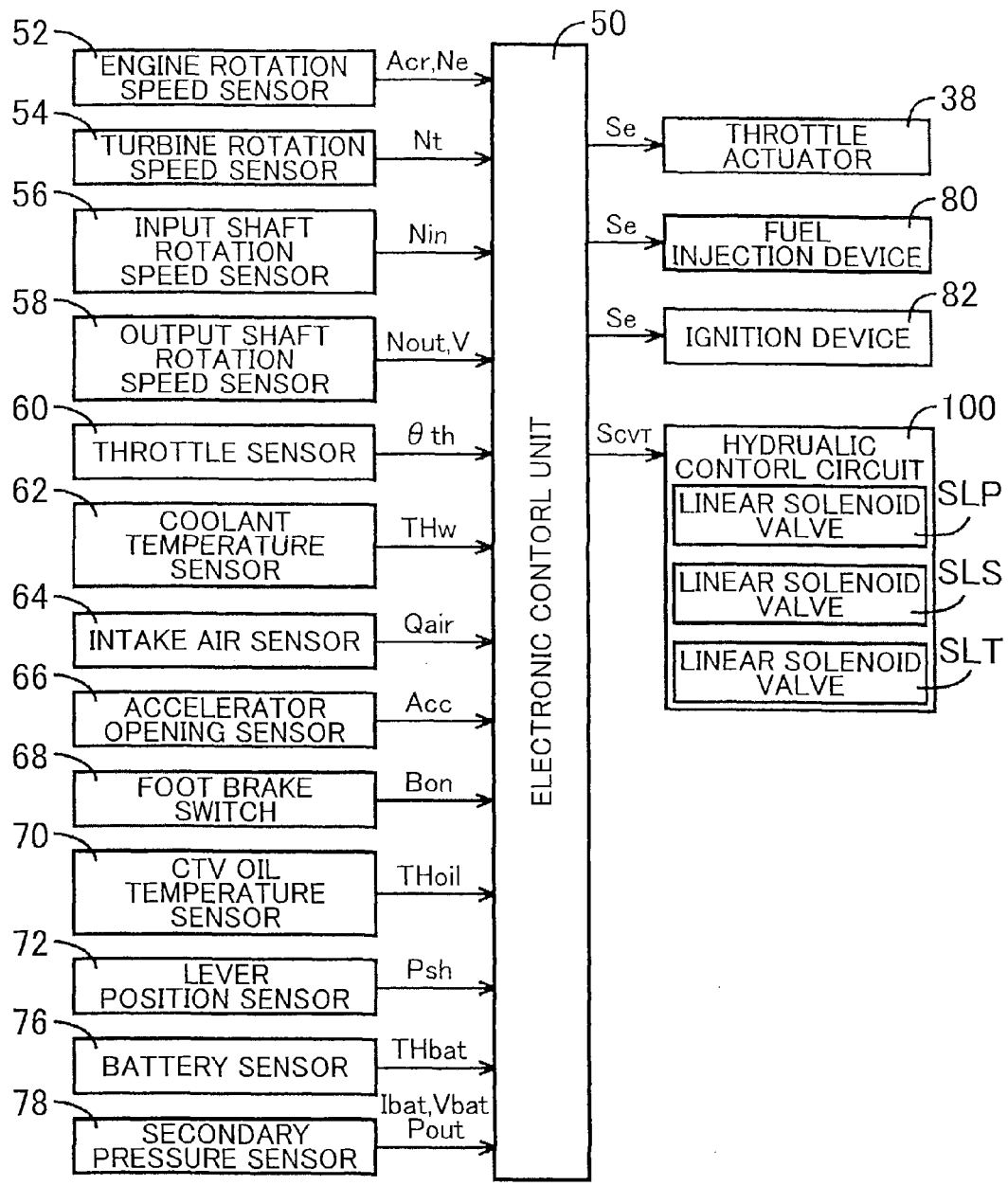
FIG. 2 is a block diagram illustrating a principal part of a control system mounted on the vehicle so as to control the engine or a continuously-variable transmission illustrated in FIG. 1.

FIG. 2 is a block diagram illustrating principal parts of a control system mounted on the vehicle 10 for controlling the engine 12, the continuously-variable transmission 18, and the like. In FIG. 2, the vehicle 10 is provided, for example, with an electronic control unit 50 (corresponding to the gear shifting controller in the claims) including a continuously-variable transmission controller for a vehicle associated with the gear shifting control of the continuously-variable transmission 18. The electronic control unit 50 is constituted by a microcomputer including a CPU, a RAM, a ROM, and an input and output interface. The CPU performs various controls of the vehicle 10 by processing signals in accordance with a program stored in the ROM in advance using the temporary storage function of the RAM. For example, the electronic control unit 50 is configured to perform the output control of the engine 12, the gear shifting control or the belt pinching pressure control of the continuously-variable transmission 18, the torque capacity control of the lockup clutch 26, and the like and is divided into a part for engine control and a part for hydraulic control of the continuously-variable transmission 18 and the lockup clutch 26 if necessary.

The electronic control unit 50 is supplied with a signal indicating the rotation angle (position) Acr of the crank shaft 13 and the rotation speed (engine rotation speed) Ne of the engine 12 detected by an engine rotation speed sensor 52, a signal indicating the rotation speed (turbine rotation speed) Nt of the turbine shaft 30 detected by a turbine rotation speed sensor 54, a signal indicating the input shaft rotation speed Nin as the rotation speed of the input shaft 32 (the primary pulley 42) of the continuously-variable transmission 18 detected by an input shaft rotation speed sensor 56, a signal indicating the output shaft rotation speed Nout as the rotation speed of the output shaft 44 (the secondary pulley 46) of the continuously-variable transmission 18 corresponding to the vehicle speed V and detected by an output shaft rotation speed sensor 58, a signal indicating a throttle opening θth of the electronic throttle valve 40 detected by a throttle sensor 60, a signal indicating a coolant temperature THw of the engine 12 detected by a coolant temperature sensor 62, a signal indicating the amount of intake air Qair of the engine 12 detected by an intake air sensor 64, a signal indicating an accelerator opening Acc which is a pressure on an accelerator pedal as a driver's acceleration request detected by an accelerator opening sensor 66, a signal indicating a brake ON state Bon indicating a state where a foot brake as a regular brake is operated and detected by a foot brake switch 68, a signal indicating the oil temperature THoil of working oil of the continuously-variable transmission 18 or the like detected by a CVT oil temperature sensor 70, a signal indicating a lever position (operated position) Psh of a shift lever detected by a lever position sensor 72, a signal indicating a battery temperature THbat, a battery input and output current (battery charging and discharging current) Ibat, or a battery voltage Vbat detected by a battery sensor 76, a signal indicating the secondary pressure Pout as the hydraulic pressure supplied to the secondary pulley 46 and detected by a secondary pressure sensor 78, and the like. The electronic control unit 50 sequentially calculates the actual gear shifting ratio γ (=Nin/Nout) of the continuously-variable transmission 18 on the basis of the output shaft rotation speed Nout and the input shaft rotation speed Nin.

An engine output control command signal Se for controlling the output of the engine 12, a hydraulic control command signal $S_{CVT}$ for controlling an oil pressure for gear shifting of the continuously-variable transmission 18, and the like are output from the electronic control unit 50. Specifically, as the engine output control command signal Se, a throttle signal for driving the throttle actuator 38 to control the switching of the electronic throttle valve 40, an injection signal for controlling an amount of fuel injected from a fuel injection device 80, an ignition timing signal for controlling the ignition timing of the engine 12 through the use of an ignition device 82, and the like are output. As the hydraulic control command signal $S_{CVT}$, a command signal for driving a linear solenoid valve SLP for controlling the primary pressure Pin, a command signal for driving a linear solenoid valve SLS for controlling the secondary pressure Pout, a command signal for driving a linear solenoid valve SLT for controlling a line pressure PL, and the like are output to the hydraulic control circuit 100.

Figure 3:
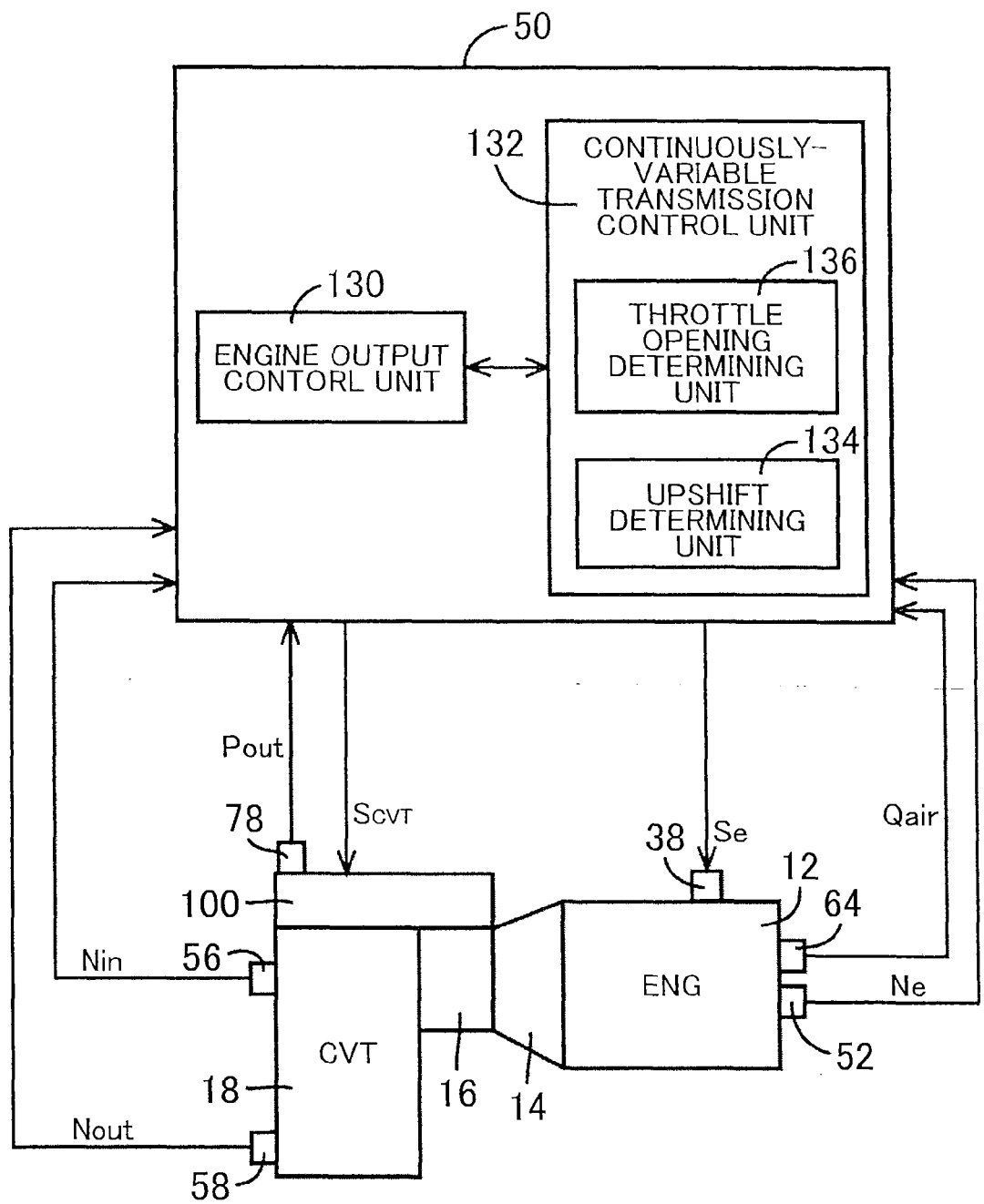
FIG. 3 is a functional block diagram illustrating a principal part of a control function of an electronic control unit illustrated in FIG. 2.

FIG. 3 is a functional block diagram illustrating principal parts of the control function of the electronic control unit 50. An engine output control unit 130 outputs the engine output control command signal Se such as the throttle signal, the injection signal, and the ignition timing signal to the throttle actuator 38, the fuel injection device 80, or the ignition device 82, for example, for the output control of the engine 12. For example, the engine output control unit 130 sets a target engine torque Te* for acquiring a request driving force (driving torque) calculated on the basis of the accelerator opening Acc and the vehicle speed V, controls the switching of the electronic throttle valve 40 through the use of the throttle actuator 38 so as to achieve the target engine torque Te*, and controls the amount of fuel injected from the fuel injection device 80 or the ignition timing of the ignition device 82.

A continuously-variable transmission control unit 132 controls the gear shifting ratio γ of the continuously-variable transmission 18 so as to be the target gear shifting ratio γ* calculated on the basis of the accelerator opening Acc, the vehicle speed V, the brake signal Bon, and the like. Specifically, the continuously-variable transmission control unit 132 determines a primary command pressure Pintgt as a command value (or a target primary pressure Pin*) of the primary pressure Pin and a secondary command pressure Pouttgt as a command value (or a target secondary pressure Pout*) of the secondary pressure Pout so as not to cause the belt slip of the continuously-variable transmission 18 and so as to achieve the target gear shifting ratio γ* of the continuously-variable transmission 18 at which the operating point of the engine 12 is located in the optimal line, and outputs the primary command pressure Pintgt and the secondary command pressure Pouttgt to the hydraulic control circuit 100.

In the upshifting of the automatic transmission, a so-called torque-down control for decreasing the engine torque Te in a transition period of gear shifting is performed in the related art. By performing the torque-down control, a variation of an output shaft torque (specifically, a sense of overshoot) due to a variation of an inertia torque during the upshifting decreases. It is known that a region (hereinafter, referred to as dead zone) in which the variation of the engine torque Te with respect to the variation of the throttle opening θth is small is present in a high-opening region of the throttle opening θth. When the upshifting is performed in the dead zone, the variation of the engine torque Te with respect to the variation of the throttle opening θth is small, it is thus difficult to synchronize the torque-down start timing of the engine torque Te with the gear shifting start timing of the automatic transmission, and the variation of the output shaft torque during the gear shifting can easily occur. On the contrary, in a stepped-variable automatic transmission, since a relatively-large delay time (for example, about 0.5 sec) is present until the gear shifting is actually started after the gear shifting start command is output, the engine torque Te can be decreased in synchronization with the gear shifting start by decreasing the throttle opening θth up to the lower end of the dead zone in the meantime. However, in continuously-variable transmission 18 as in this embodiment, since the delay time until the gear shifting is started from the timing at which the gear shifting start command is output is shorter than that in the stepped-variable automatic transmission, it is difficult to synchronize the engine torque decrease timing with the gear shifting start timing. Accordingly, since the engine torque Te does not decrease at the gear shifting start timing, there is a possibility that the effect of torque-down control is not obtained but a variation of the output shaft torque (shock) during the gear shifting will occur.

Therefore, the electronic control unit 50 suppresses the variation of the output shaft torque output from the output shaft 44 during the gear shifting by delaying the outputting the gear shifting start command of the continuously-variable transmission 18 with respect to the decrease start command of the electronic throttle valve 40 in the upshifting of the continuously-variable transmission 18. The control state in the upshifting of the continuously-variable transmission 18 will be mainly described below.

An upshift determining unit 134 determines whether the continuously-variable transmission 18 is shifted to a speedup side, that is, whether the upshifting is performed. When the shift position is selected as a manual shift position which can be shifted to a virtually-set gear shift stage by a manual operation and it is detected that the shift lever for switching the gear shift stage is manually operated to an upshift side corresponding to the speedup stage by a driver, the upshift determining unit 134 determines that the continuously-variable transmission 18 upshifts. That is, the manual operating time is the time at which it is determined that the continuously-variable transmission 18 upshifts.

When the vehicle runs in a mode in which the continuously-variable transmission 18 is automatically shifted to a virtually-set gear shifting stage and the running state of the vehicle exceeds, for example, an upshift line in a predetermined gear shifting diagram including the accelerator opening Acc and the vehicle speed V, the upshift determining unit 134 determines that the continuously-variable transmission 18 upshifts. Even at the time of upshifting, gradual (stepped) automatic gear shifting of decreasing the gear shifting ratio γ of the continuously-variable transmission 18 by a predetermined width for a short time is performed and thus the rotation variation during the gear shifting increases unlike the normal continuously-variable transmission control.

When it is determined by the upshift determining unit 134 that the continuously-variable transmission 18 upshifts, a continuously-variable transmission control unit 132 is activated. The continuously-variable transmission control unit 132 activates a throttle opening determining unit 136 before starting the gear shifting of the continuously-variable transmission 18. The throttle opening determining unit 136 detects the throttle opening θth and determines whether the throttle opening θth is equal to or greater than a predetermined value α. The predetermined value α is acquired in advance by experiment and is set to, for example, a lower end or a value in the vicinity thereof in a region in which the variation of the engine torque Te with respect to the variation of the throttle opening θth is small. It is known that a region in which the variation of the engine torque Te with respect to the variation of the throttle opening θth is small, that is, a so-called dead zone, is present in the high-opening region of the throttle opening θth, and the engine torque Te hardly decreases even by decreasing the throttle opening θth in this region. Therefore, when the throttle opening θth is equal to or greater than the predetermined value α, it is difficult to rapidly perform the torque-down control from the upshifting start time of the continuously-variable transmission 18.

When it is determined by the throttle opening determining unit 136 that the throttle opening θth is less than the predetermined value α, the continuously-variable transmission control unit 132 outputs the gear shifting start command for the upshifting of the continuously-variable transmission 18 to start the gear shifting. In the region in which the throttle opening θth is less than the predetermined value α, since the engine torque Te rapidly decreases with respect to the decrease of the throttle opening θth, the gear shifting start timing of the continuously-variable transmission 18 is substantially synchronized with the decrease start timing of the engine torque Te due to the decrease of the throttle opening θth. Accordingly, since the engine torque Te decreases from the gear shifting start timing, the variation of the output shaft torque during the gear shifting is suppressed by the torque-down control.

When it is determined by the throttle opening determining unit 136 that the throttle opening θth at the timing at which the gear shifting to the upshift side is determined is equal to or greater than the predetermined value α, the continuously-variable transmission control unit 132 delays the output of the gear shifting start command of the continuously-variable transmission 18. At the same time, that is, at the timing at which it is determined that the throttle opening θth is equal to or greater than the predetermined value α, the continuously-variable transmission control unit 132 outputs the decrease start command of the throttle opening θth to the engine output control unit 130. Accordingly, the engine output control unit 130 starts the decrease of the throttle opening θth. The engine output control unit 130 controls the throttle actuator 38 so as to decrease the throttle opening θth of the electronic throttle valve 40 to a predetermined value β and to hold the throttle opening θth at the predetermined value β when the throttle opening θth reaches the predetermined value β. In decreasing the throttle opening θth to the predetermined value β, since the throttle opening θth is in the dead zone, the engine torque Te hardly decreases. In this way, the gear shifting start command of the continuously-variable transmission 18 is delayed with respect to the decrease start command of the throttle opening θth of the electronic throttle valve.

The predetermined value β is set to the lower end or the value in the vicinity thereof in the dead zone in which the variation of the engine torque Te with respect to the variation of the throttle opening θth is small. In other words, the predetermined value β is set to a value with which the engine torque Te can decrease substantially at the same time as the decrease of the throttle opening θth. Since the predetermined value α and the predetermined value β are set to the lower end or the vicinity thereof in the dead zone, both values are equal to each other or hardly vary. However, since both values do not need to be set to the same numerical value, both values are referenced by different reference signs in this embodiment.

The throttle opening determining unit 136 frequently detects the throttle opening θth during the decreasing of the throttle opening θth and determines whether the detected value reaches the predetermined value β. When it is determined by the throttle opening determining unit 136 that the throttle opening θth decreases to the predetermined value β, the continuously-variable transmission control unit 132 outputs the gear shifting start command for starting the upshifting of the continuously-variable transmission 18 and the gear shifting is started substantially at the same time. When the gear shifting start command is output, the engine output control unit 130 further decreases the throttle opening θth at the same time to decrease the engine torque Te (torque-down control). At this time, since the throttle opening θth decreases to the predetermined value β in advance, the engine torque Te decreases substantially at the same time as the decreasing of the throttle opening θth. Accordingly, since the engine torque Te decreases substantially at the same time as the gear shifting start timing of the continuously-variable transmission 18, the torque-down control is performed to suppress the variation of the output shaft torque. Here, the gear shifting delay time Tdelay until the gear shifting start command is output after it is determined that the continuously-variable transmission 18 upshifts is the time until the throttle opening θth reaches the predetermined value β after the gear shifting is determined. In this way, when the throttle opening θth reaches the predetermined value β with which the engine torque Te can decrease, the gear shifting of the continuously-variable transmission 18 is rapidly started and thus the increase of the gear shifting delay time Tdelay is suppressed. When the gear shifting ends, the engine output control unit 130 ends the torque-down control and returns the engine torque Te to the normal torque.

Figure 4:
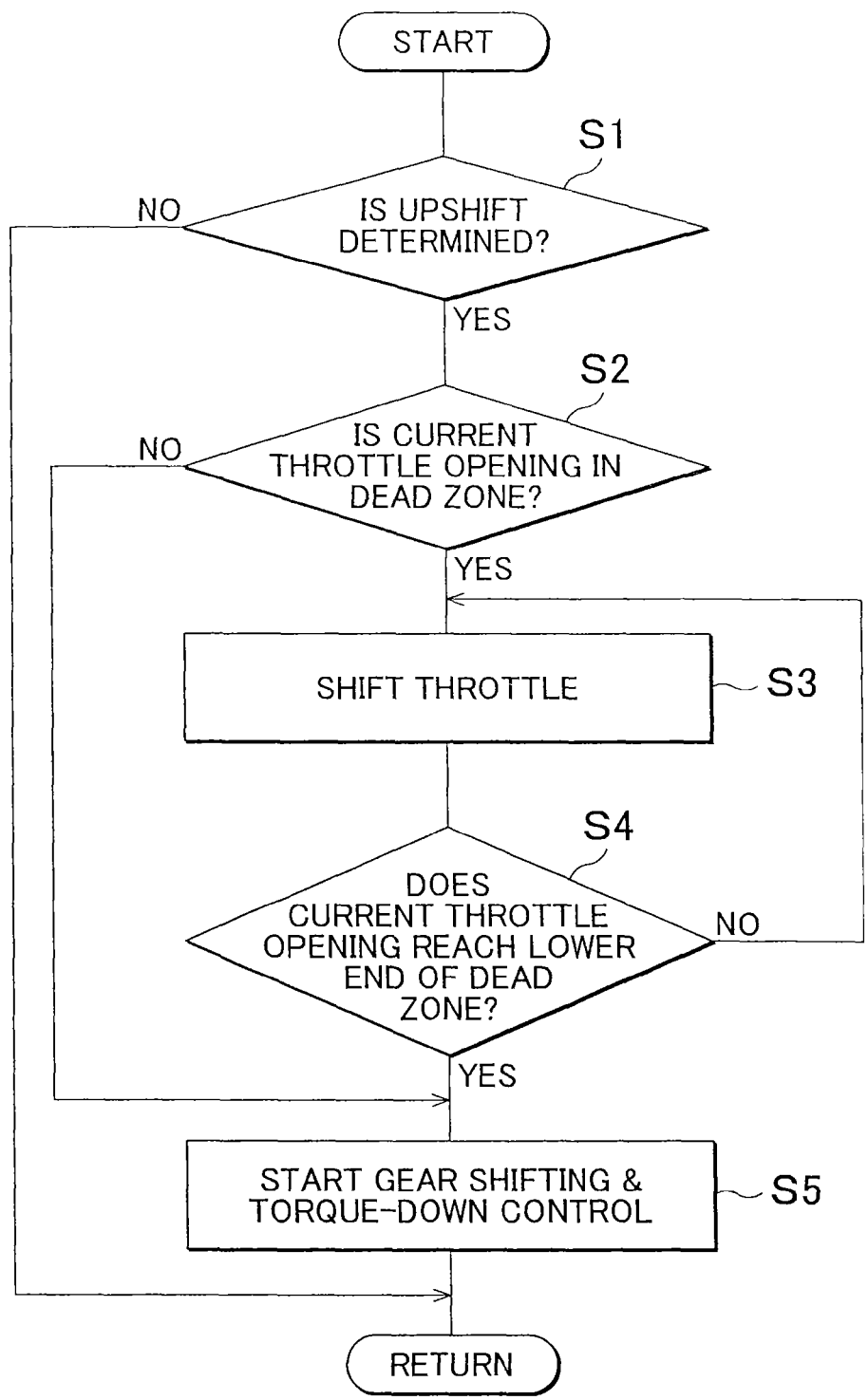
FIG. 4 is a flowchart illustrating a principal part of a control operation of the electronic control unit illustrated in FIG. 2, that is, a control operation capable of suppressing a variation of an output shaft torque which occurs during upshifting of the continuously-variable transmission.

FIG. 4 is a flowchart illustrating the principal parts of the control operation of the electronic control unit 50, that is, the control operation capable of suppressing the variation of the output shaft torque during the upshifting of the continuously-variable transmission 18. This flowchart is repeatedly performed with a very short cycle of, for example, about several msec to several tens of msec.

In step S1 (hereinafter, "step" is omitted) corresponding to the upshift determining unit 134, it is determined whether the gear shifting determination of performing the upshifting of the continuously-variable transmission 18 is performed. When the determination result of S1 is negative, this routine ends. When the determination result of S1 is positive, it is determined whether the current throttle opening θth is in the dead zone, specifically, when the current throttle opening θth is equal to or greater than the predetermined value α, in S2 corresponding to the continuously-variable transmission control unit 132 and the throttle opening determining unit 136. When the determination result of S2 is negative, the upshifting of the continuously-variable transmission 18 and the torque-down control of the engine 12 are started in S5 corresponding to the continuously-variable transmission control unit 132 and the engine output control unit 130. Since the throttle opening θth is in a region less than the predetermined value α, the torque-down control of the engine 12 is started substantially at the same time as the upshifting of the continuously-variable transmission 18 and thus the variation of the output shaft torque during the gear shifting is also suppressed.

When the determination result of S2 is positive, the throttle opening θth decreases to the predetermined value β in S3 corresponding to the engine output control unit 130. Subsequently, in S4 corresponding to the throttle opening determining unit 136, it is determined whether the throttle opening θth reaches the predetermined value β (the lower end of the dead zone). When the determination result of S4 is negative, the decrease of the throttle opening θth is repeatedly performed in S3 until the throttle opening θth reaches the predetermined value β. When the throttle opening θth decreases to the predetermined value β and the determination result of S4 is positive, the upshifting of the continuously-variable transmission 18 and the torque-down control of the engine 12 are started in S5. In the state where the throttle opening θth decreases up to the predetermined value β, the engine torque Te decreases substantially at the same time as the decrease of the throttle opening θth, the engine torque Te decreases substantially at the same time as the upshifting of the continuously-variable transmission 18, and the variation of the output shaft torque during the gear shifting is also suppressed.

Figure 5:
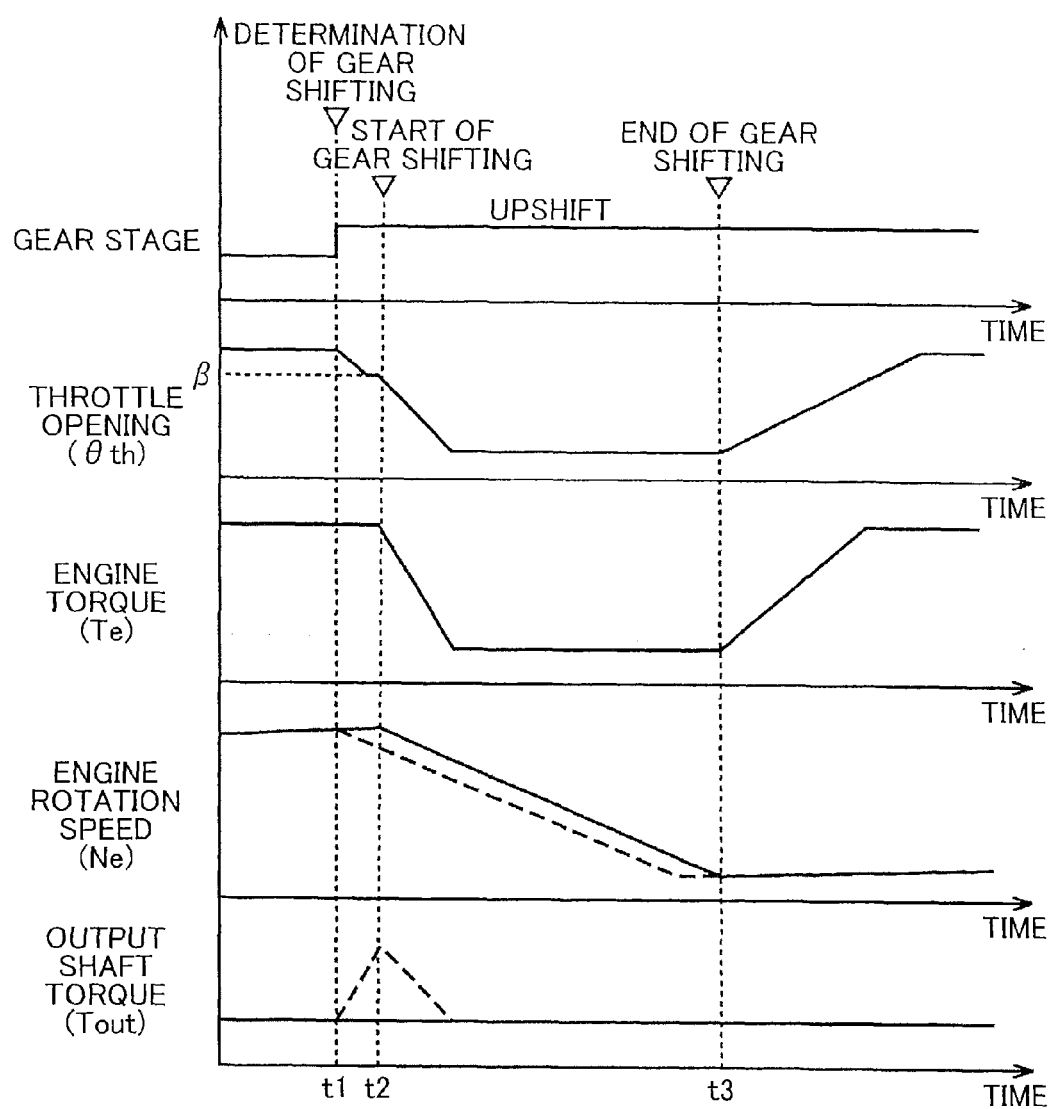
FIG. 5 is a timing chart illustrating the operation result of the control operation based on the flowchart illustrated in FIG. 4.

FIG. 5 is a timing chart illustrating the operation result of the control operation based on the flowchart illustrating in FIG. 4. FIG. 5 is based on the premise that the throttle opening θth is in the dead zone (the region equal to or greater than the predetermined value α) before the upshifting of the continuously-variable transmission 18. In FIG. 5, the horizontal axis represents the time t (sec) and the vertical axis represents the gear shifting determination of the continuously-variable transmission 18, the throttle opening θth, the engine torque Te, the engine rotation speed Ne, and the output shaft torque Tout sequentially from the uppermost. The decrease of the throttle opening θth is started in advance when the gear shifting determination for the upshifting of the continuously-variable transmission 18 is performed at time t1 of FIG. 5, and the throttle opening θth is held at the predetermined value β when the throttle opening θth decreases up to the predetermined value β. When the throttle opening θth decreases up to the predetermined value β, the gear shifting start command for causing the continuously-variable transmission 18 to upshift is output. Then, when the engine rotation speed Ne starts the decrease at time t2, the throttle opening θth further decreases and the engine torque Te decreases substantially at the same time as the decrease of the engine rotation speed. In this way, since the engine torque Te decreases substantially at the same time as the start of the gear shifting, the variation of the output shaft torque Tout due to the variation of the inertia torque is canceled by the torque-down of the engine torque Te, as indicated by a solid line. When the gear shifting ends at time t3, the torque-down control of the engine 12 ends.

The dashed line of FIG. 5 corresponds to the control in the related art. In the related art, since the gear shifting start command is output at the same time as determining the upshifting of the continuously-variable transmission 18, the gear shifting start timing and the engine torque Te decrease timing are mismatched with each other as indicated by the dashed line. Accordingly, since the torque-down control is not performed at the gear shifting start timing, the variation of the output shaft torque (Tout) occurs from the gear shifting start timing as indicated by the dashed line.

As described above, according to this embodiment, it is possible to start the decrease of the engine torque Te from the gear shifting start timing of the continuously-variable transmission 18 by decreasing the throttle opening θth of the electronic throttle valve 40 in advance while delaying the gear shifting start command of the continuously-variable transmission 18 so as to start the decrease of the engine torque Te at the timing at which the gear shifting of the continuously-variable transmission 18 is started. Accordingly, since the torque-down control is performed from the gear shifting start timing, it is possible to suppress the variation of the output shaft torque during the gear shifting.

According to this embodiment, when the decrease start command of the throttle opening θth of the electronic throttle valve 40 is output, the decrease of the engine torque Te can be started substantially at the same time as the start of the gear shifting by decreasing the throttle opening θth to the predetermined value β in advance before the gear shifting start command is output.

According to this embodiment, since the upshifting of the continuously-variable transmission 18 is the gear shifting based on a driver's manual operation, the output of the gear shifting start command is delayed with respect to the start of the decrease of the throttle opening θth after the manual operation, the throttle opening θth decreases in advance at the timing at which the gear shifting start command is output or at the timing at which the start of the gear shifting is determined, and it is thus possible to decrease the engine torque Te at the same time as the start of the gear shifting. Accordingly, it is possible to substantially synchronize the gear shifting start timing of the continuously-variable transmission 18 and the decrease start timing of the engine torque Te with each other.

According to this embodiment, since the upshifting of the continuously-variable transmission 18 is the stepped-variable automatic gear shifting, the output of the gear shifting start command of the continuously-variable transmission 18 is delayed with respect to the start of the decrease of the throttle opening θth after the manual operation, the throttle opening θth decreases in advance at the timing at which the gear shifting start command is output or at the timing at which the start of the gear shifting is determined, and it is thus possible to decrease the engine torque Te at the same time as the start of the gear shifting. Accordingly, it is possible to substantially synchronize the gear shifting start timing of the continuously-variable transmission 18 and the decrease start timing of the engine torque Te with each other.

Another embodiment of the present invention will be described below. Elements in this embodiment common to the above-mentioned embodiment will be referenced by the same reference numerals and description thereof will not be repeated.

Embodiment 2

In the above-mentioned embodiment, the gear shifting delay time Tdelay until the gear shifting start command is output after the upshifting of the continuously-variable transmission 18 is determined is determined on the basis of the actual throttle opening θth. In this embodiment, the gear shifting delay time Tdelay is set to a value acquired off-line in advance and outputs the gear shifting start command with a delay of the set gear shifting delay time Tdelay after the upshifting is determined. That is, when the upshifting of the continuously-variable transmission 18 is determined, a timer control of delaying the output of the gear shifting start command by the predetermined gear shifting delay time Tdelay.

Figure 6:
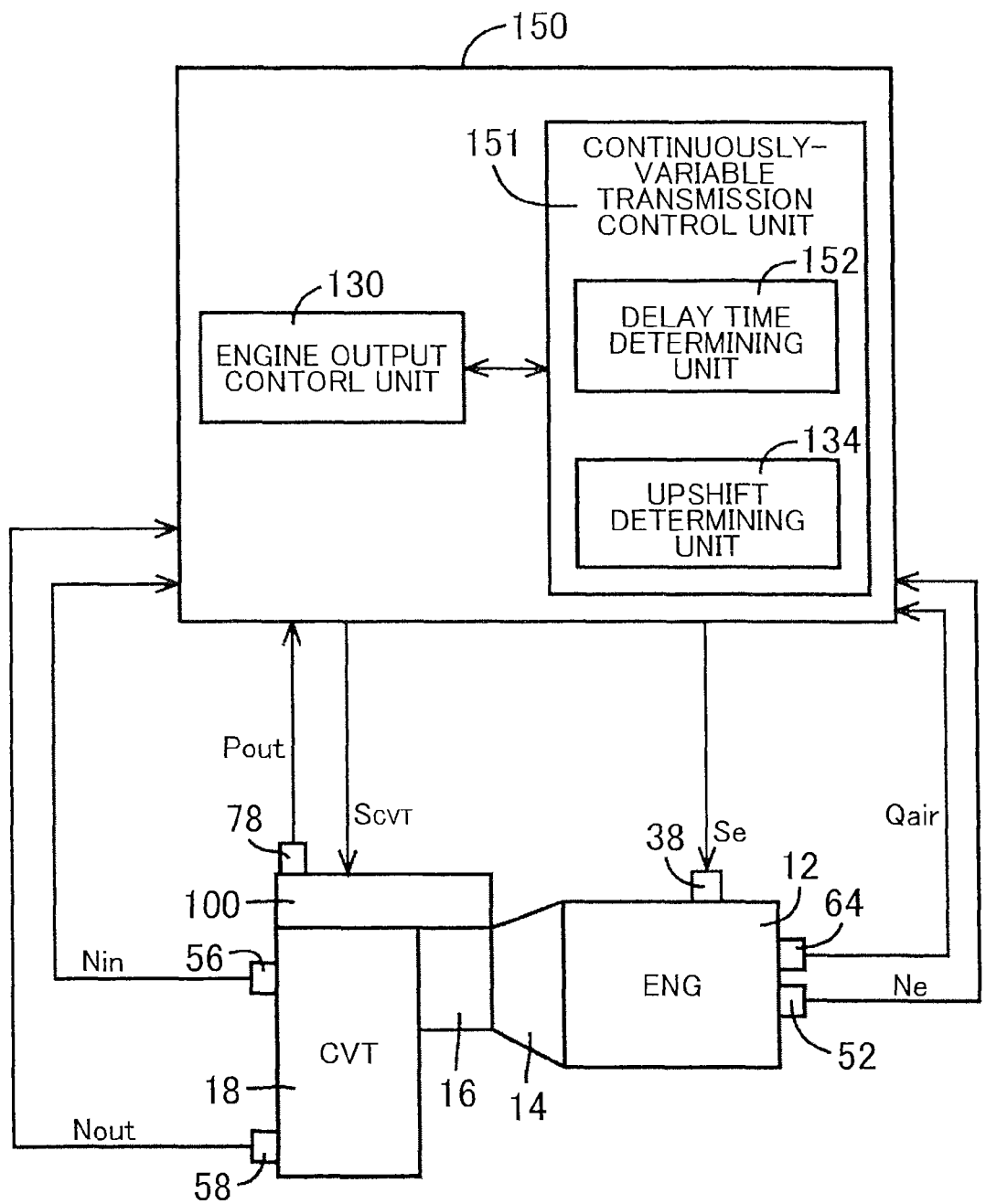
FIG. 6 is a functional block diagram functionally illustrating the control operation of an electronic control unit according to another embodiment of the present invention, which corresponds to FIG. 3 associated with the above-mentioned embodiment.

FIG. 6 is a functional block diagram functionally illustrating the control operation of an electronic control unit 150 (corresponding to the gear shifting controller in the claims) according to another embodiment of the present invention and corresponds to FIG. 3 in the above-mentioned embodiment. In the functional block diagram of FIG. 6, the continuously-variable transmission control unit 151 functionally includes an upshift determining unit 134 and a delay time determining unit 152. The upshift determining unit 134 has the same function as in the above-mentioned embodiment and thus description thereof will not be repeated.

When the performing of the upshifting of the continuously-variable transmission 18 is determined by the upshift determining unit 134, the engine output control unit 130 starts the decrease of the throttle opening θth. The engine output control unit 130 controls the throttle actuator 38 so as to decrease the throttle opening θth of the electronic throttle valve 40 up to the predetermined value β and to hold the throttle opening θth at the predetermined value β when the throttle opening θth reaches the predetermined value β.

Figures 7, 8:
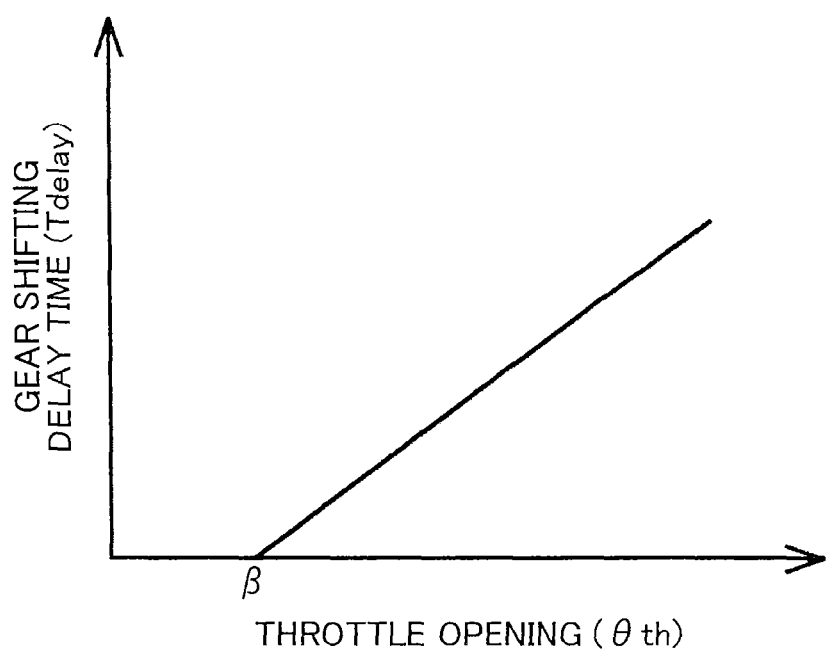
FIG. 7 is a diagram illustrating an example of a map for calculating a gear shifting delay time.
FIG. 8 is a diagram illustrating the tendency of the gear shifting delay time with respect to a throttle opening.

The delay time determining unit 152 is activated at the same time as determining the upshifting of the continuously-variable transmission 18. The delay time determining unit 152 stores a relational map of the gear shifting delay time Tdelay including the throttle opening θth and the oil temperature THoil of working oil, which is acquired by experiment off-line in advance, for example, as illustrated in FIG. 7, and determines the optimal gear shifting delay time Tdelay on the basis of the relational map. As can be seen from FIG. 7, the gear shifting delay time Tdelay is appropriately changed on the basis of the throttle opening θth and the oil temperature THoil of working oil.

FIG. 8 is a diagram illustrating a relationship of the gear shifting delay time Tdelay with respect to the throttle opening θth. As illustrated in FIG. 8, the gear shifting delay time Tdelay is set to be longer as the throttle opening θth becomes greater. This is because as the throttle opening θth becomes greater, the difference from the predetermined value β becomes greater and the time required for reaching the predetermined value β becomes longer. In the region less than the predetermined value β, the gear shifting delay time Tdelay is set to zero.

Figure 9:
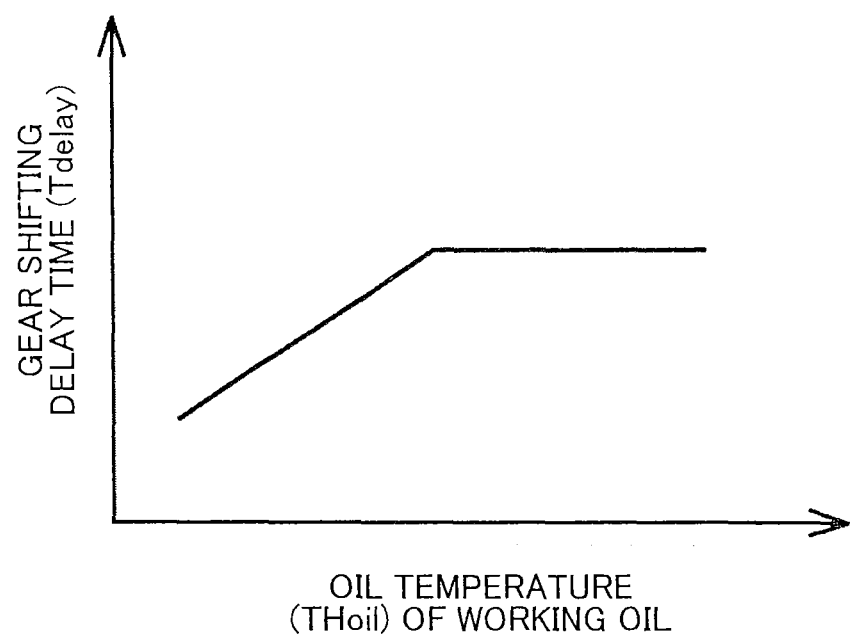
FIG. 9 is a diagram illustrating the tendency of the gear shifting delay time with respect to an oil temperature of working oil supplied to a hydraulic control circuit of the continuously-variable transmission.

FIG. 9 is a diagram illustrating a relationship of the gear shifting delay time Tdelay with respect to the oil temperature THoil of working oil supplied to the hydraulic control circuit 100 of the continuously-variable transmission 18. As illustrated in FIG. 9, when the oil temperature THoil of working oil is in a low-temperature region, the gear shifting delay time Tdelay is set to be shorter as the oil temperature THoil of working oil becomes lower. This is because when the oil temperature THoil of working oil is low, the gear shifting responsiveness of the continuously-variable transmission 18 degrades, the time until the gear shifting is started after the gear shifting start command is output extends, and thus the time required for decreasing the throttle opening θth to the predetermined value β is guaranteed even when the gear shifting delay time Tdelay is shortened.

In the relational map illustrated in FIG. 7, specific numerical values are set to match with the relational diagrams illustrated in FIGS. 8 and 9. The delay time determining unit 152 determines the optimal gear shifting delay time Tdelay on the basis of the actual throttle opening θth and the oil temperature THoil of working oil from the relational map illustrated in FIG. 7. When the gear shifting delay time Tdelay is determined from the map acquired off-line, the gear shifting delay time Tdelay is not based on the actual throttle opening θth and thus, for example, a predetermined margin may be set so as not to start the gear shifting before the throttle opening θth reaches the predetermined value β.

Figure 10:
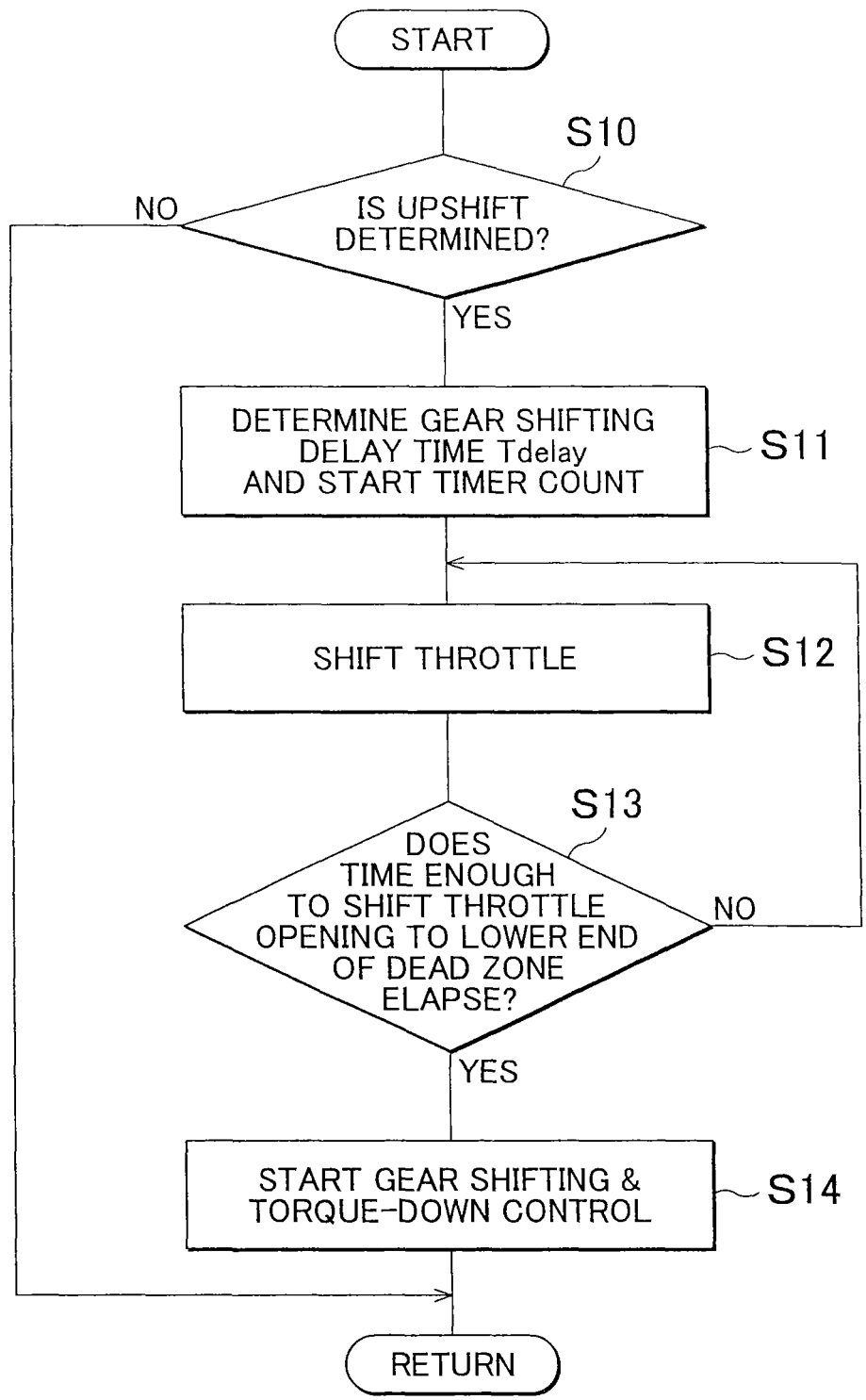
FIG. 10 is another flowchart illustrating a principal part of a control operation of the electronic control unit illustrated in FIG. 6, that is, a control operation capable of suppressing a variation of an output shaft torque which occurs during upshifting of the continuously-variable transmission.

FIG. 10 is a flowchart illustrating principal parts of the control operation of the electronic control unit 150, that is, the control operation capable of suppressing the variation of the output shaft torque during the upshifting of the continuously-variable transmission 18.

In FIG. 10, in S10 corresponding to the upshift determining unit 134, it is determined whether the gear shifting determination of performing the upshifting of the continuously-variable transmission 18 is performed. When the determination result of S10 is negative, this routine ends. When the determination result of S10 is positive, the gear shifting delay time Tdelay is determined on the basis of the actual throttle opening θth and the oil temperature THoil of working oil from the relational map of the gear shifting delay time Tdelay illustrated in FIG. 7 and the counting of the timer is started, in S11 corresponding to the continuously-variable transmission control unit 151 and the delay time determining unit 152. Subsequently, in S12 corresponding to the engine output control unit 130, the decrease of the throttle opening θth is started. It is illustrated in the flowchart that steps S11 and S12 are sequentially performed, but both steps are actually performed in parallel. In S13 corresponding to the continuously-variable transmission control unit 151, it is determined whether the timer under counting elapses the gear shifting delay time Tdelay determined in S11. In other words, it is indirectly determined whether the throttle opening θth decreases up to the predetermined value β which is the lower end of the dead zone on the basis of the gear shifting delay time Tdelay. When the determination result of S13 is negative, the decrease of the throttle opening θth is repeatedly performed in S12. When the determination result of S13 is positive, the upshifting of the continuously-variable transmission 18 and the torque-down control of the engine 12 are started in S14 corresponding to the continuously-variable transmission control unit 151 and the engine output control unit 130. At this time, since the throttle opening θth decreases up to the predetermined value β corresponding to the lower end of the dead zone, the torque-down control of the engine 12 is started substantially at the same time as the start of the gear shifting of the continuously-variable transmission 18 and the variation of the output shaft torque during the gear shifting is also suppressed.

As described above, substantially the same effects as in the above-mentioned embodiment can be achieved from this embodiment. Since the gear shifting delay time Tdelay is determined on the basis of the map illustrated in FIG. 7 or the like, the control burden is reduced and the present invention can be put into practice even without including the throttle sensor 60. It is possible to obtain the optimal gear shifting delay time Tdelay by appropriately changing the gear shifting delay time Tdelay on the basis of at least one of the throttle opening θth of the electronic throttle valve 40 and the oil temperature THoil of working oil, it is possible to synchronize the gear shifting start timing of the continuously-variable transmission 18 and the decrease starting timing of the engine torque Tr with each other, and it is possible to suppress an increase of the gear shifting delay time.

Embodiment 3

In this embodiment, when the upshifting of the continuously-variable transmission 18 is determined, an amount of intake air Qair is directly detected, a variation rate Qv or a variation quantity ΔQair of an amount of air [Qair/Ne] per the engine rotation speed Ne is frequently calculated, and the gear shifting start command of the continuously-variable transmission 18 is output on the basis of the variation rate Qv or the variation quantity ΔQair. The amount of air per the engine rotation speed Ne and the engine torque Te have a one-to-one correspondence. Accordingly, by calculating the variation rate Qv or the variation quantity ΔQair, the variation of the engine torque Te is directly understood. The amount of air per the engine rotation speed Ne may be replaced with the absolute value [Qair] thereof.

Figure 11:
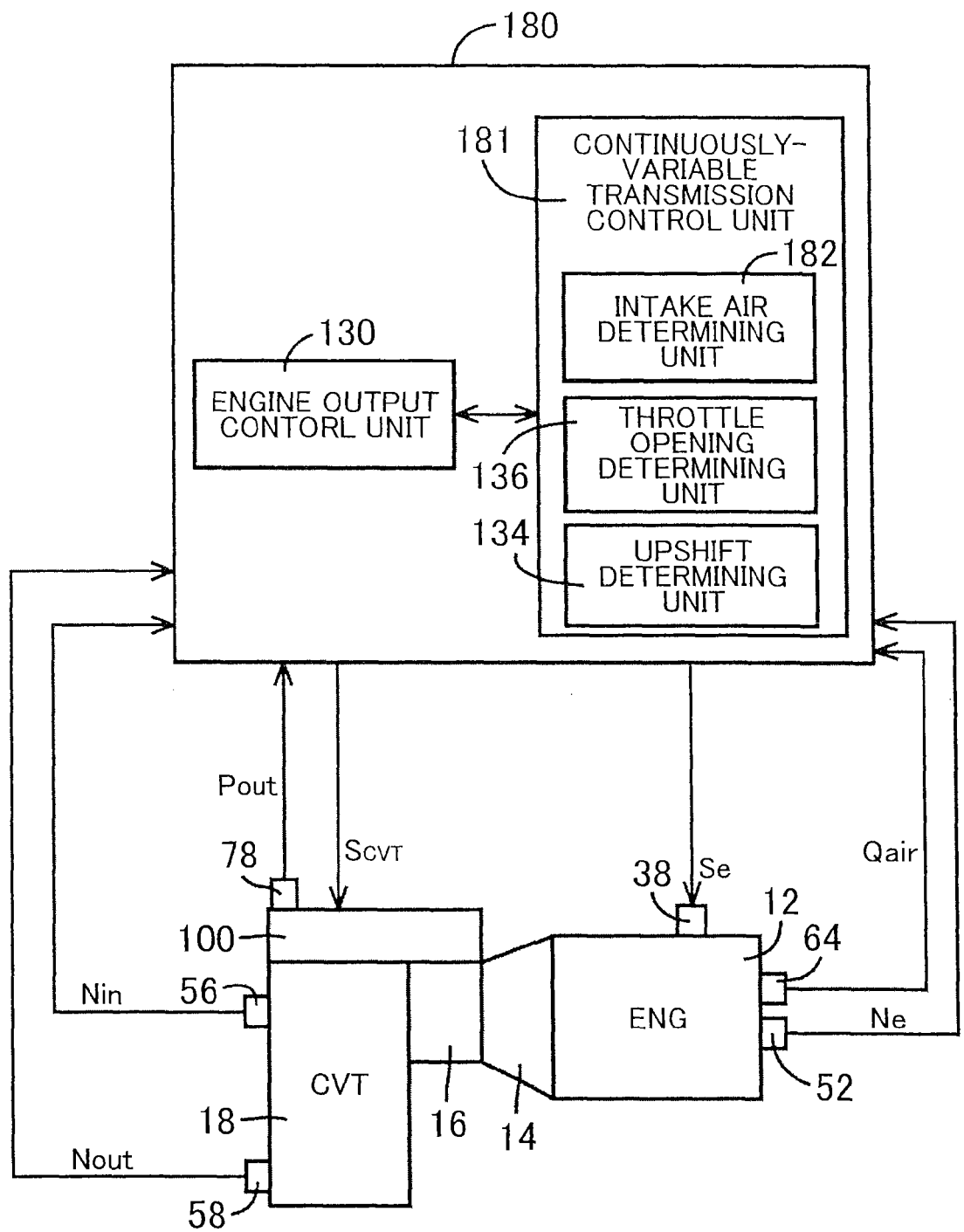
FIG. 11 is a functional block diagram functionally illustrating the control operation of an electronic control unit according to still another embodiment of the present invention.

FIG. 11 is a functional block diagram illustrating the control operation of an electronic control unit 180 (correspond to the gear shifting control unit in the claims) according to this embodiment. In the functional block diagram illustrated in FIG. 11, a continuously-variable transmission control unit 181 includes an intake air determining unit 182 in addition to the upshift determining unit 134 and the throttle opening determining unit 136.

When the gear shifting of the upshifting of the continuously-variable transmission 18 is determined by the upshift determining unit 134, the throttle opening determining unit 136 determines whether the throttle opening θth is located in the dead zone, that is, is greater than the predetermined value α. When the throttle opening θth is located in the dead zone, the engine output control unit 130 starts the control of decreasing the throttle opening θth. At the same time, the intake air determining unit 182 frequently detects the amount of intake air Qair, frequently calculates the variation rate Qv or the variation quantity ΔQair of the amount of intake air Qair, and determines whether the calculated variation rate Qv or the variation quantity ΔQair of the amount of intake air Qair reaches a predetermined value γ set in advance. Here, the predetermined value γ is calculated in advance by experiment, specifically is set to a threshold value or a value in the vicinity thereof of the value with which the engine torque Te varies. When it is determined that the variation rate Qv or the variation quantity ΔQair of the amount of intake air Qair reaches the predetermined value γ, the continuously-variable transmission control unit 181 outputs the gear shifting start command of the upshifting of the continuously-variable transmission 18 to start the gear shifting. The engine output control unit 130 starts the torque-down control of the engine torque Te substantially at the same time as the output of the gear shifting start command, but since the throttle opening θth decreases in advance up to the decreasing value of the engine torque Te, the decrease of the engine torque Te is started substantially at the same time as the start of the gear shifting of the continuously-variable transmission 18. When the gear shifting is finished, the engine output control unit 130 increases the throttle opening θth to return the engine torque Te to the normal state.

Figure 12:
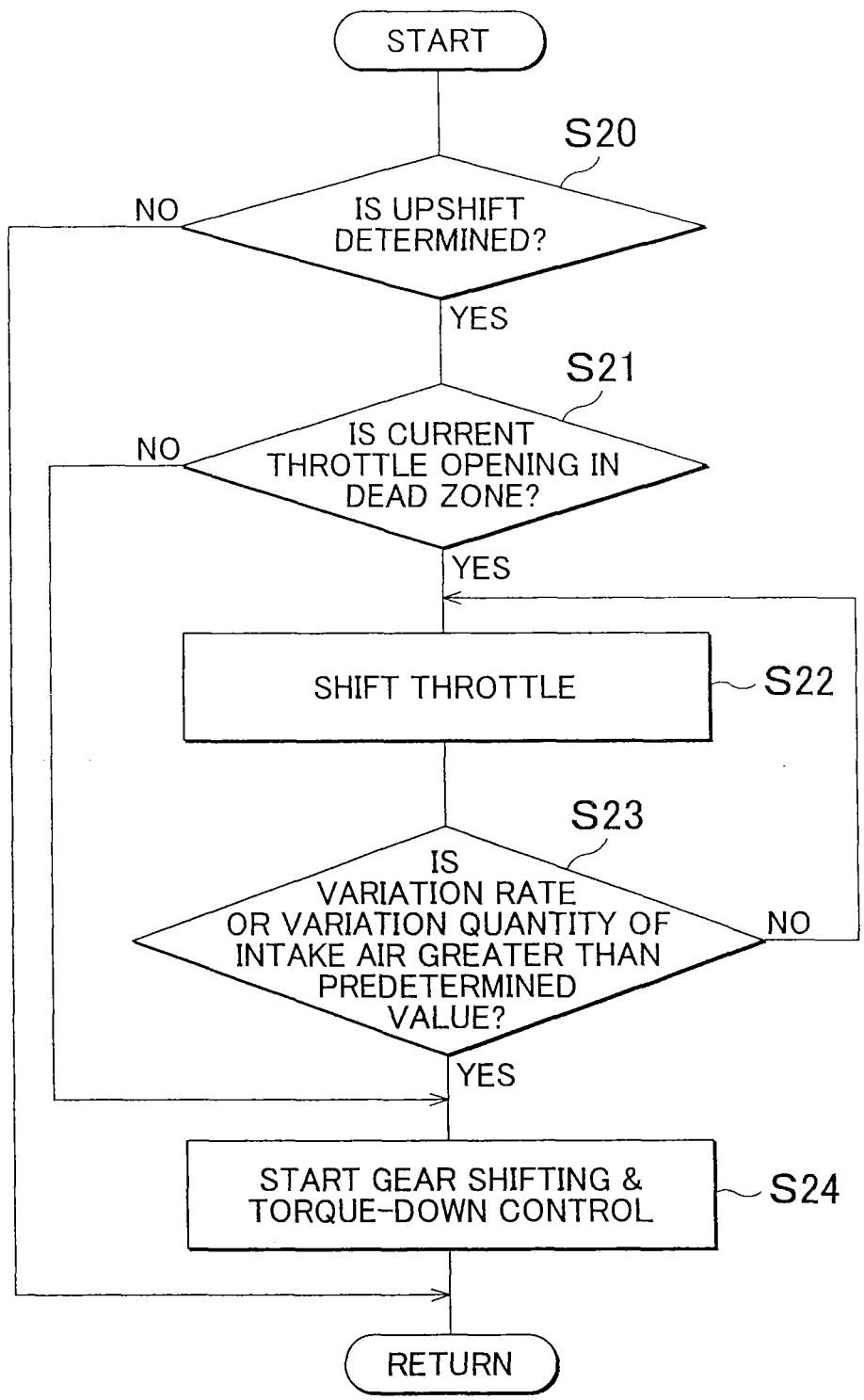
FIG. 12 is another flowchart illustrating a principal part of a control operation of the electronic control unit illustrated in FIG. 11, that is, a control operation capable of suppressing a variation of an output shaft torque which occurs during upshifting of the continuously-variable transmission.

FIG. 12 is a flowchart illustrating principal parts of the control operation of the electronic control unit 180, that is, the control operation capable of suppressing the variation of the output shaft torque in the transition period of the upshifting of the continuously-variable transmission 18.

In S20 corresponding to the upshift determining unit 134, it is determined whether the determination for performing the upshifting of the continuously-variable transmission 18 is performed. When the determination result of S20 is negative, this routine ends. When the determination result of S20 is positive, it is determined whether the current throttle opening θth is in the dead zone in S21 corresponding to the throttle opening determining unit 136. When the determination result of S21 is negative, the process of S24 is performed. When the determination result of S21 is positive, the decrease of the throttle opening θth is started in S22 corresponding to the engine output control unit 130. Subsequently, in S23 corresponding to the intake air determining unit 182, it is determined whether the variation rate Qv or the variation quantity ΔQair of the amount of intake air per the engine rotation speed Ne is greater than the predetermined value γ set in advance. When the determination result of S23 is negative, the decrease of the throttle opening θth is repeatedly performed in S22. When the determination result of S23 is positive, the upshifting of the continuously-variable transmission 18 and the torque-down control of the engine 12 are started substantially at the same time in S24 corresponding to the continuously-variable transmission control unit 181 and the engine output control unit 130. At this time, since the engine torque Te decreases substantially at the same time as the start of the gear shifting of the continuously-variable transmission 18, the variation of the output shaft torque during the gear shifting is also suppressed.

As described above, substantially the same effects as in the above-mentioned embodiment can be achieved from this embodiment. In this embodiment, since the decrease of the engine torque Te is determined on the basis of the variation rate Qv or the variation quantity ΔQair of the amount of intake air per the engine rotation speed Ne, it is possible to more accurately determine the timing at which the engine torque Te decreases.

Embodiment 4

In the above-mentioned embodiments, the start of the gear shifting of the continuously-variable transmission 18 is delayed even when it is determined that the upshifting of the continuously-variable transmission 18 is performed, but the gear shifting is not started at the intended timing of the control. Therefore, in this embodiment, the gear shifting for the upshifting is predicted and the decrease of the throttle opening θth is started before the upshift command is output. Accordingly, by decreasing the throttle opening θth to the predetermined value β in advance at the timing at which the upshift command of the continuously-variable transmission 18 is output, it is possible to perform the torque-down control of the engine torque Te substantially at the same time as the start of the gear shifting. In the below description, it is assumed that the throttle opening θth is in the dead zone (the region equal to or greater than the predetermined value α) and the vehicle runs in a mode in which the continuously-variable transmission 18 is shifted to a virtually-set gear shifting stage in a gradual (stepped) manner on the basis of a predetermined gear shifting diagram.

Figure 13:
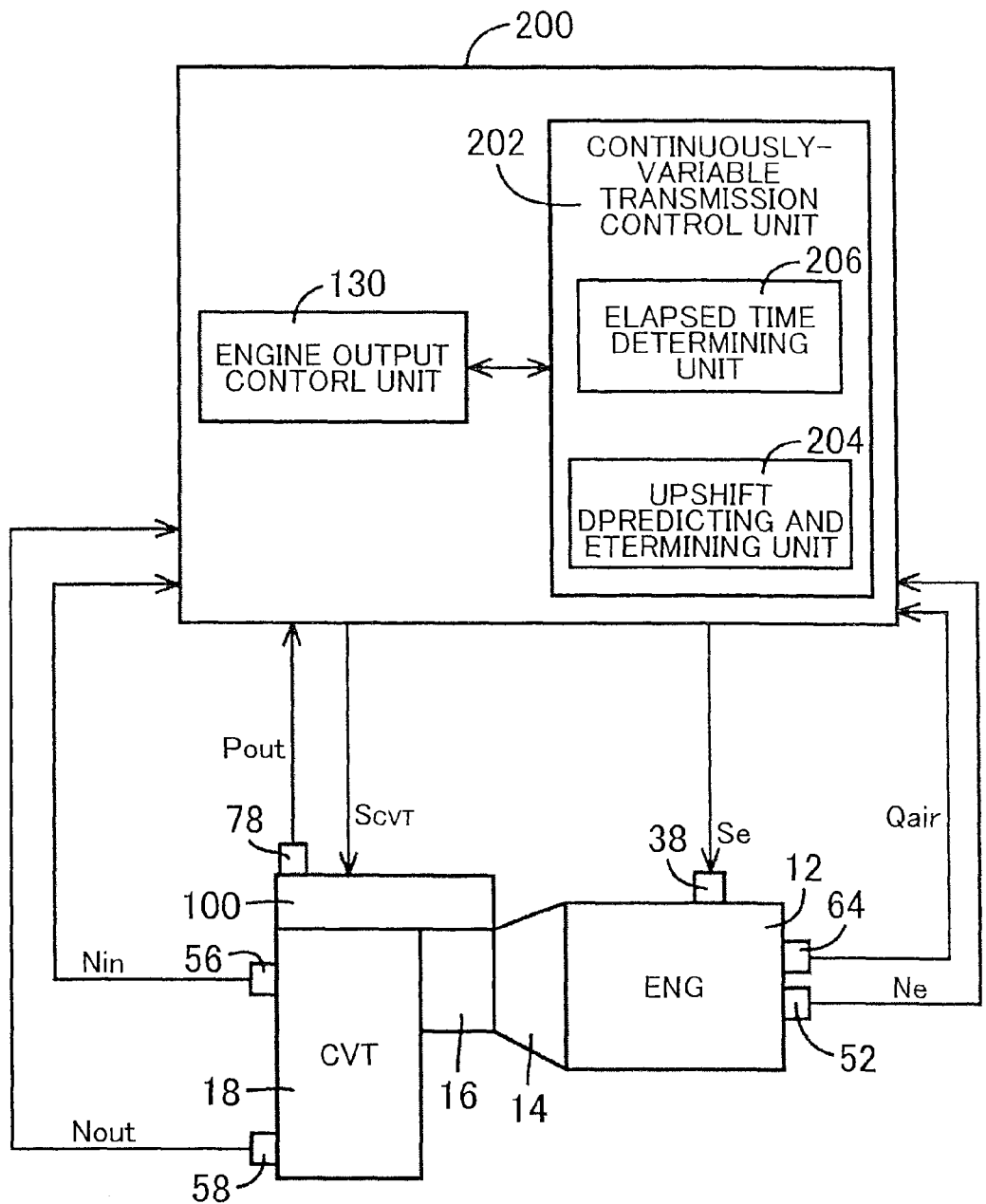
FIG. 13 is a functional block diagram functionally illustrating the control operation of an electronic control unit according to still another embodiment of the present invention.

FIG. 13 is a functional block diagram functionally illustrating the control operation of an electronic control unit 200 (the gear shifting control unit in the claims) according to this embodiment. A continuously-variable transmission control unit 202 in this embodiment includes an upshift predicting and determining unit 204 and an elapsed time determining unit 206.

The upshift predicting and determining unit 204 predicts the gear shifting determination for the upshifting of the continuously-variable transmission 18 in advance. For example, when it is determined that the running state of the vehicle after a predetermined time Ta set in advance elapses exceeds the upshift line in a predetermined gear shifting diagram including the accelerator opening Acc and the vehicle speed V, the upshift predicting and determining unit 204 predicts the upshift after the predetermined time Ta elapses. The upshift predicting and determining unit 204 frequently detects the vehicle speed V, frequently calculates a variation rate dV/dt of the vehicle speed V, and calculates a vehicle speed Va after the predetermined time Ta elapses on the basis of the vehicle speed V and the variation rate dV/dt thereof. The upshift predicting and determining unit 204 frequently detects the accelerator opening Acc, frequently calculates a variation rate of dAcc/dt of the accelerator opening Acc, and calculates an accelerator opening Acca after the predetermined time Ta elapses on the basis of the accelerator opening Acca and the variation rate of dAcc/dt thereof. The upshift predicting and determining unit 204 determines whether the running state of the vehicle after the predetermined time Ta elapses exceeds the upshift line on the basis of the calculated vehicle speed Va and the calculated accelerator opening Acca after the predetermined time Ta elapses, and predicts that the gear shifting start command for the upshift is output after the predetermined time Ta when the running state of the vehicle after the predetermined time Ta elapses exceeds the upshift line. Here, the predetermined time Ta is set in advance by experiment or the like and is set to a time in which the throttle opening θth reaches the lower end of the dead zone, that is, the predetermined value β. The predetermined time Ta may be appropriately changed on the basis of the throttle opening θth, the oil temperature THoil of working oil, or the like.

When it is predicted by the upshift predicting and determining unit 204 that the gear shifting determination (gear shifting start command) for the upshift after the predetermined time Ta elapses is performed, the engine output control unit 130 controls the throttle actuator 38 before starting the gear shifting for the upshifting of the continuously-variable transmission 18 so as to start the decrease of the throttle opening θth to the predetermined value β corresponding to the lower end value of the dead zone and to hold the throttle opening θth at the predetermined value β when the throttle opening θth reaches the predetermined value.

The elapsed time determining unit 206 starts counting an elapsed time t from the timing at which the upshifting of the continuously-variable transmission 18 after the predetermined time Ta elapses is predicted, and determines whether the elapsed time t is greater than the predetermined time Ta. When it is determined that the elapsed time t is greater than the predetermined time Ta, the continuously-variable transmission control unit 202 outputs the gear shifting start command for the upshifting of the continuously-variable transmission 18 and starts the gear shifting. At the same time, the engine output control unit 130 performs the torque-down control of the engine 12. At this time, since the throttle opening θth decreases up to the predetermined value β in advance, the decrease of the engine torque Te is started substantially at the same time as the timing at which the upshifting of the continuously-variable transmission 18 is started and the variation of the output shaft torque during the gear shifting is suppressed.

Figure 14:
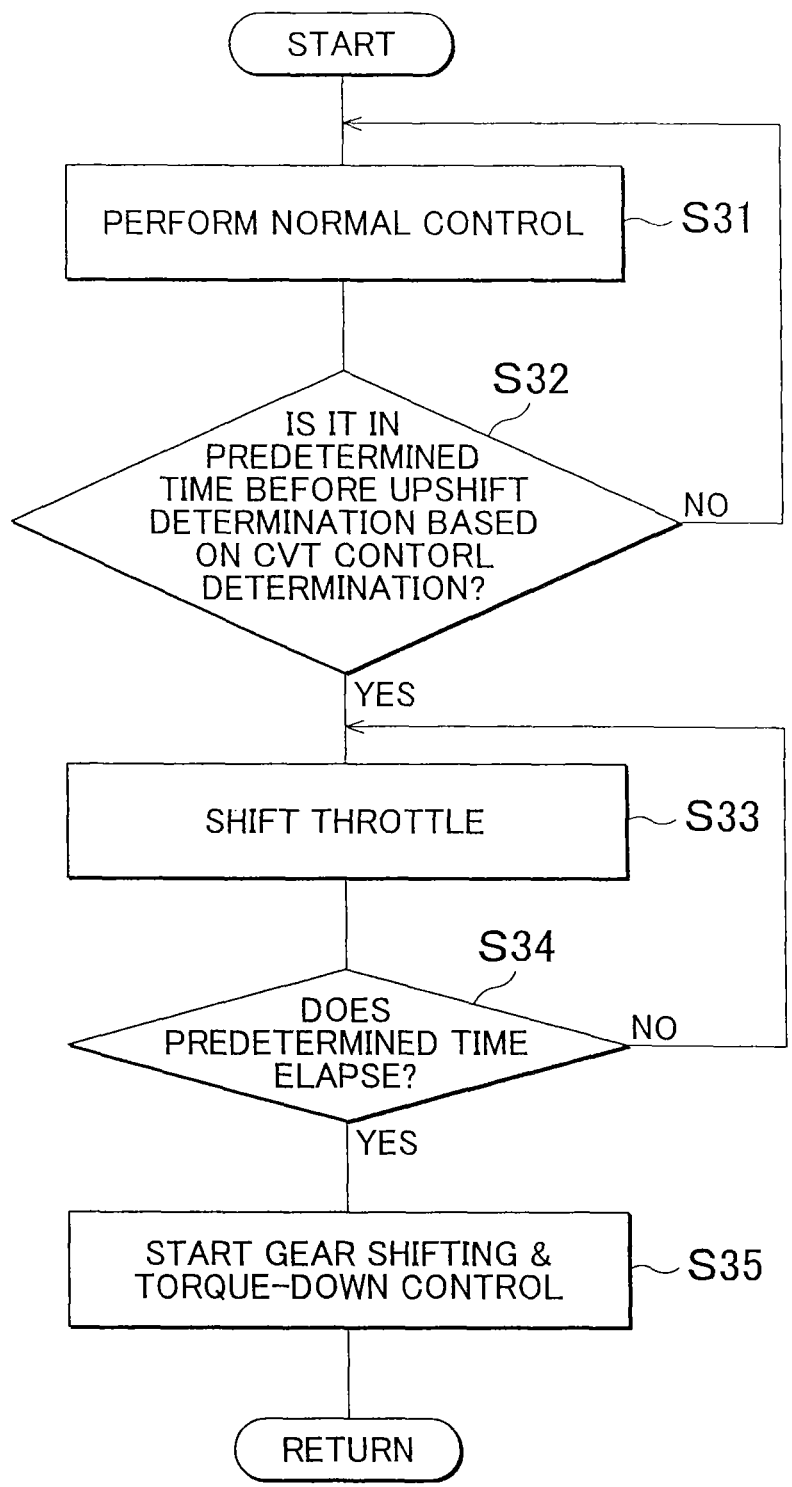
FIG. 14 is another flowchart illustrating a principal part of a control operation of the electronic control unit illustrated in FIG. 13, that is, a control operation capable of suppressing a variation of an output shaft torque which occurs during upshifting of the continuously-variable transmission.

FIG. 14 is a flowchart illustrating principal parts of the control operation of the electronic control unit 200, that is, the control operation capable of suppressing the variation of the output shaft torque during the upshifting of the continuously-variable transmission 18.

First, the running control in normal running is performed in S31, and it is determined that it is in the predetermined time Ta before the upshifting of the continuously-variable transmission 18 is determined in S32 corresponding to the upshift predicting and determining unit 204. That is, it is determined whether the running state exceeds a predetermined upshift line after the predetermined time Ta elapses on the basis of the vehicle speed V or the accelerator opening Acc after the predetermined time Ta elapses. When the determination result of S32 is negative, the normal running control is repeatedly performed in S31. When the determination result of S32 is positive, the decrease of the throttle opening θth is started and the counting of the elapse time t is started in S33 corresponding to the engine output control unit 130 and the elapsed time determining unit 206. In S34 corresponding to the elapsed time determining unit 206, it is determined whether the counted elapsed time t reaches the predetermined time Ta. When the determination result of S34 is negative, the decrease of the throttle opening θth is repeatedly performed in S33. When the determination result of S34 is positive, the upshifting of the continuously-variable transmission 18 is started and the torque-down control of the engine 12 is started, in S35 corresponding to the continuously-variable transmission control unit 202 and the engine output control unit 130.

Figure 15:
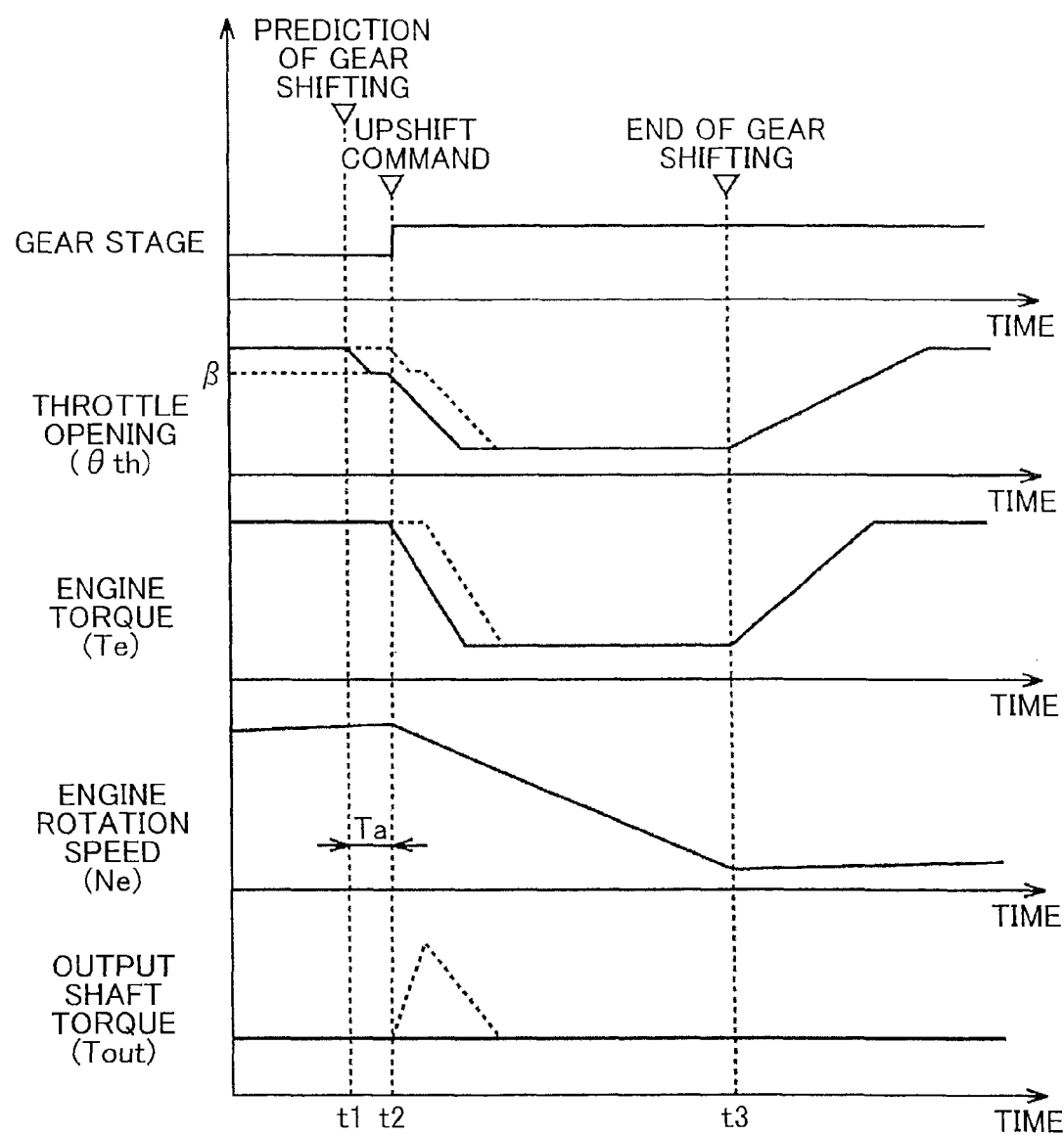
FIG. 15 is a timing chart illustrating the operation result of the control operation based on the flowchart illustrated in FIG. 14.

FIG. 15 is a timing chart illustrating the operation result of the control operation of the electronic control unit 200. FIG. 15 is based on the premise that the vehicle runs in a state where the throttle opening θth is in the dead zone. When it is determined (predicted) at time t1 that the running state of the vehicle after the predetermined time Ta elapses exceeds the predetermined upshift line, the decrease of the throttle opening θth is started from time t1. When the throttle opening θth reaches the predetermined value β (the lower end of the dead zone), the throttle opening θth is held at the value. At time t2 at which the predetermined time Ta elapses after time t1, the gear shifting command for the upshifting of the continuously-variable transmission 18 is output and the gear shifting is started. In the continuously-variable transmission 18, when the gear shifting start command is output and the gear shifting is started, the engine rotation speed Ne immediately decreases. The torque-down control of the engine 12 is started at time t2, but since the throttle opening θth decreases up to the predetermined value β in advance, the engine torque Te also decreases from time t2. Accordingly, the variation of the inertia torque due to the variation of the engine rotation speed Ne is canceled by the torque-down of the engine 12 from time t2 and thus the torque variation is suppressed. As indicated by the dashed line, when the decrease of the throttle opening θth is started at time t2 at which the upshift command of the continuously-variable transmission 18 is output, the decrease of the engine torque Te is started with a delay from time t2 at which the gear shifting is started and thus the variation of the output shaft torque during the gear shifting occurs.

As described above, substantially the same effects as in the above-mentioned embodiment are obtained from this embodiment. In this embodiment, since the timing at which the continuously-variable transmission 18 upshifts is predicted and the throttle opening θth decreases in advance, the gear shifting is started from the timing at which the upshift command of the continuously-variable transmission 18 is output, and it is thus possible to prevent the delay of the gear shifting.

While the embodiments of the present invention have been described in detail with reference to the accompanying drawings, the present invention may be embodied in other aspects.

For example, the above-mentioned embodiments have been independently described, but the embodiments may be combined without being contradictory to each other. For example, the timing of outputting the gear shifting start command is generally determined on the basis of the throttle opening θth, but when the throttle sensor 60 is out of order, the timing of outputting the gear shifting start command may be determined on the basis of the gear shifting delay time Tdelay calculated on the basis of the map.

In the above-mentioned embodiments, the gear shifting delay time Tdelay calculated off-line is changed on the basis of the throttle opening θth and the oil temperature THoil of working oil, but the gear shifting delay time Tdelay may be fixed to a constant value.

In the above-mentioned embodiments, the gear shifting delay time Tdelay is set on the basis of the throttle opening θth and the oil temperature THoil of working oil, but does not need to be set on the basis of both thereof and may be determined on the basis of any one thereof.

In the map illustrated in FIG. 7 in the above-mentioned embodiment, the specific value of the gear shifting delay time Tdelay does not need to be fixed, and the gear shifting delay time Tdelay may be frequently changed by a learning control. For example, the value may be frequently changed by estimating the variation of the output shaft torque during the upshift from the variation rate of the output shaft rotation speed Nout or the like and performing the learning control of the gear shifting delay time Tdelay on the basis of the estimated value.

In the above-mentioned embodiment, the belt-type continuously-variable transmission 18 is used as the continuously-variable transmission, but the present invention may be applied to a continuously-variable transmission having another configuration, such as a toroidal-type continuously-variable transmission.

In the above-mentioned embodiment, the predetermined value α and the predetermined value β may be set to the same numerical value. The predetermined value α and the predetermined value β may be appropriately changed depending on the coolant temperature THw of the engine 12.

In the above-mentioned embodiment, the gear shifting start command is output when the throttle opening θth reaches the predetermined value β, but the gear shifting start command may be output in the transition period to the predetermined value β.

The order of the specific steps in the flowcharts in the above-mentioned embodiments may be appropriately changed without being contradictory to each other.

The above description is only an example and the present invention may be modified or improved in various forms without departing from the knowledge of those skilled in the art.

What is claimed is:

1. A shifting control system for a vehicle including driving wheels, the shifting control system comprising:
    an engine that includes an electronic throttle valve configured to change a torque of the engine;
    a continuously-variable transmission that is disposed in a power transmission path between the engine and the driving wheels; and
    an electronic control unit configured to:
        i) output a decrease start command to start decreasing the torque of the engine by decreasing a throttle opening of the electronic throttle valve when a decision is made to upshift the continuously-variable transmission, and
        ii) output a shifting start command for starting the upshifting of the continuously-variable transmission after a delay relative to the decrease start command.

2. The shifting control system according to claim 1, wherein the electronic control unit is configured to decrease the throttle opening to a predetermined value after the decrease start command is output, and
    the electronic control unit is configured to further decrease the throttle opening when the shifting start command of the continuously-variable transmission is output.

3. The shifting control system according to claim 1, wherein the electronic control unit is configured to decrease the throttle opening to a predetermined value after the decrease start command is output, and
    the electronic control unit is configured to further decrease the throttle opening when determining that the upshifting is started.

4. The shifting control system according to claim 1, wherein the upshifting of the continuously-variable transmission is shifting based on a driver's manual operation.

5. The shifting control system according to claim 1, wherein the upshifting of the continuously-variable transmission is stepped automatic shifting.

6. The shifting control system according to claim 1, wherein the electronic control unit is configured to determine whether the continuously-variable transmission upshifts, and
    the electronic control unit is configured to change a delay time until the shifting start command is output after determining that the continuously-variable transmission upshifts on the basis of at least one of the throttle opening of the electronic throttle valve and an oil temperature of working oil of the continuously-variable transmission.

7. The shifting control system according to claim 1, wherein the continuously-variable transmission includes a pair of variable pulleys.

\* \* \* \* \*